United States Patent
Takahashi et al.

(10) Patent No.: US 12,353,105 B2
(45) Date of Patent: *Jul. 8, 2025

(54) DISPLAY APPARATUS

(71) Applicant: Semiconductor Energy Laboratory Co., Ltd., Kanagawa-ken (JP)

(72) Inventors: Kei Takahashi, Kanagawa (JP);
Susumu Kawashima, Kanagawa (JP);
Koji Kusunoki, Kanagawa (JP);
Kouhei Toyotaka, Kanagawa (JP);
Kazunori Watanabe, Tokyo (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/388,288

(22) Filed: Nov. 9, 2023

(65) Prior Publication Data
US 2024/0069398 A1    Feb. 29, 2024

Related U.S. Application Data

(63) Continuation of application No. 17/837,711, filed on Jun. 10, 2022, now Pat. No. 11,815,775, which is a (Continued)

(30) Foreign Application Priority Data

Jan. 19, 2018  (JP) .................................. 2018-006841

(51) Int. Cl.
*G02F 1/1362*    (2006.01)
*G02F 1/133*    (2006.01)
(Continued)

(52) U.S. Cl.
CPC ........ *G02F 1/136286* (2013.01); *G02F 1/133* (2013.01); *G02F 1/1368* (2013.01);
(Continued)

(58) Field of Classification Search
None
See application file for complete search history.

(56) References Cited

U.S. PATENT DOCUMENTS 5,854,616 A * 12/1998 Ota .................... G02F 1/13624
345/94
7,005,916 B2    2/2006 Nakahira et al.
(Continued)

FOREIGN PATENT DOCUMENTS

| CN | 001437175 A | 8/2003 |
| CN | 001437319 A | 8/2003 |

(Continued)

OTHER PUBLICATIONS

International Search Report (Application No. PCT/IB2019/050112) Dated Mar. 12, 2019.

(Continued)

*Primary Examiner* — Kirk W Hermann
(74) *Attorney, Agent, or Firm* — Husch Blackwell LLP

(57) ABSTRACT

A display apparatus includes a data generation circuit, a source driver circuit, and a pixel. The source driver circuit is electrically connected to the pixel through first and second wirings. The pixel includes a display device that is a liquid crystal device, a potential of one electrode of the display device can be a potential of the first wiring, and a potential of the other electrode of the display device can be a potential of the second wiring. The image data generation circuit has a function of generating digital image data including first and second data. One of the first and second wirings is made to have a potential corresponding to first data, and the other of the first and second wirings is made to have a potential corresponding to the second data. The potential of the first wiring and the potential of the second wiring are interchanged.

5 Claims, 20 Drawing Sheets

Related U.S. Application Data continuation of application No. 16/962,304, filed as application No. PCT/IB2019/050112 on Jan. 8, 2019, now Pat. No. 11,360,363.

(51) Int. Cl.
　　*G02F 1/1368*　　(2006.01)
　　*G02F 1/137*　　(2006.01)
　　*G09G 3/20*　　(2006.01)
　　*G09G 3/36*　　(2006.01)

(52) U.S. Cl.
　　CPC ............... *G02F 1/137* (2013.01); *G09G 3/20* (2013.01); *G09G 3/2085* (2013.01); *G09G 3/36* (2013.01); *G09G 3/3611* (2013.01); *G09G 3/3648* (2013.01); *G09G 3/3655* (2013.01); *G09G 3/3659* (2013.01); *G02F 1/13793* (2021.01)

(56) References Cited

U.S. PATENT DOCUMENTS

| | | | |
|---|---|---|---|
| 7,098,885 B2 | 8/2006 | Kumada et al. | |
| 7,586,504 B2 | 9/2009 | Nakahira et al. | |
| 7,855,706 B2 | 12/2010 | Ozawa | |
| 8,102,343 B2 | 1/2012 | Yatabe | |
| 8,471,794 B2 | 6/2013 | Nakahira et al. | |
| 8,692,753 B2 | 4/2014 | Sekine | |
| 8,947,474 B2 | 2/2015 | Kim et al. | |
| 8,963,822 B2 | 2/2015 | Yoon et al. | |
| 9,520,411 B2 | 12/2016 | Takahashi et al. | |
| 9,594,281 B2 | 3/2017 | Miyake | |
| 9,633,599 B2 | 4/2017 | Ohara et al. | |
| 10,284,931 B2 | 5/2019 | Mao et al. | |
| 10,332,912 B2 | 6/2019 | Takahashi et al. | |
| 10,522,077 B2 | 12/2019 | Woo et al. | |
| 10,528,165 B2 | 1/2020 | Mori et al. | |
| 2002/0030620 A1* | 3/2002 | Cairns | G09G 3/3688 341/145 |
| 2003/0189563 A1 | 10/2003 | Sato et al. | |
| 2006/0077134 A1* | 4/2006 | Hector | G09G 3/3233 345/76 |
| 2007/0262938 A1 | 11/2007 | Kim | |
| 2008/0001901 A1 | 1/2008 | Lee | |
| 2008/0186296 A1 | 8/2008 | Tokumura | |
| 2008/0238842 A1* | 10/2008 | Yatabe | G09G 3/3688 345/87 |
| 2010/0253668 A1 | 10/2010 | Sugihara et al. | |
| 2010/0302471 A1* | 12/2010 | Kim | G02F 1/1393 349/37 |
| 2011/0279427 A1* | 11/2011 | Umezaki | G09G 3/3655 345/96 |
| 2014/0152932 A1* | 6/2014 | Miyake | G09G 3/3655 349/33 |
| 2015/0061987 A1* | 3/2015 | Jung | G09G 3/3659 345/100 |
| 2015/0145901 A1 | 5/2015 | Lee et al. | |
| 2016/0148599 A1 | 5/2016 | Lim et al. | |
| 2017/0154573 A1 | 6/2017 | Woo et al. | |
| 2017/0261775 A1* | 9/2017 | Yu | G02F 1/134363 |
| 2018/0240426 A1* | 8/2018 | Chen | H01L 27/124 |
| 2020/0150808 A1 | 5/2020 | Mori et al. | |

FOREIGN PATENT DOCUMENTS

| | | | | |
|---|---|---|---|---|
| CN | 101276563 | A | 10/2008 | |
| CN | 101122721 | A | 12/2008 | |
| CN | 101620353 | A | 1/2010 | |
| CN | 101900902 | A | 12/2010 | |
| CN | 101903938 | A | 12/2010 | |
| CN | 102053413 | A | 5/2011 | |
| CN | 103165090 | A | 6/2013 | |
| CN | 103424907 | A | 12/2013 | |
| CN | 103852943 | A | 6/2014 | |
| CN | 104541320 | A | 4/2015 | |
| CN | 105099598 | A | 11/2015 | |
| CN | 105655351 | A | 6/2016 | |
| CN | 106847186 | A | 6/2017 | |
| CN | 106875907 | A | 6/2017 | |
| CN | 107293264 | A | 10/2017 | |
| EP | 2237257 | A | 10/2010 | |
| EP | 2317502 | A | 5/2011 | |
| EP | 2472503 | A | 7/2012 | |
| EP | 2613307 | A | 7/2013 | |
| EP | 3133749 | A | 2/2017 | |
| EP | 3176774 | A | 6/2017 | |
| JP | 2008-026770 | A | 2/2008 | |
| JP | 2008-203564 | A | 9/2008 | |
| JP | 2008-250118 | A | 10/2008 | |
| JP | 2009-086170 | A | 4/2009 | |
| JP | 2009-104950 | A | 5/2009 | |
| JP | 2010-243627 | A | 10/2010 | |
| JP | 2011-227479 | A | 11/2011 | |
| JP | 2011-242721 | A | 12/2011 | |
| JP | 2011-257746 | A | 12/2011 | |
| KR | 2008-0099426 | A | 11/2008 | |
| KR | 2010-0075099 | A | 7/2010 | |
| KR | 2011-0126039 | A | 11/2011 | |
| WO | WO-2011/058885 | | 5/2011 | |
| WO | WO-2011071236 | A2 * | 6/2011 | ............ G09G 3/3275 |

OTHER PUBLICATIONS

Written Opinion (Application No. PCT/IB2019/050112) Dated Mar. 12, 2019.

Chinese Office Action (Application No. 201980007073.4) Dated Sep. 24, 2021.

Chinese Office Action (Application No. 20220718274.7) Dated May 9, 2025.

* cited by examiner

FIG. 3A1
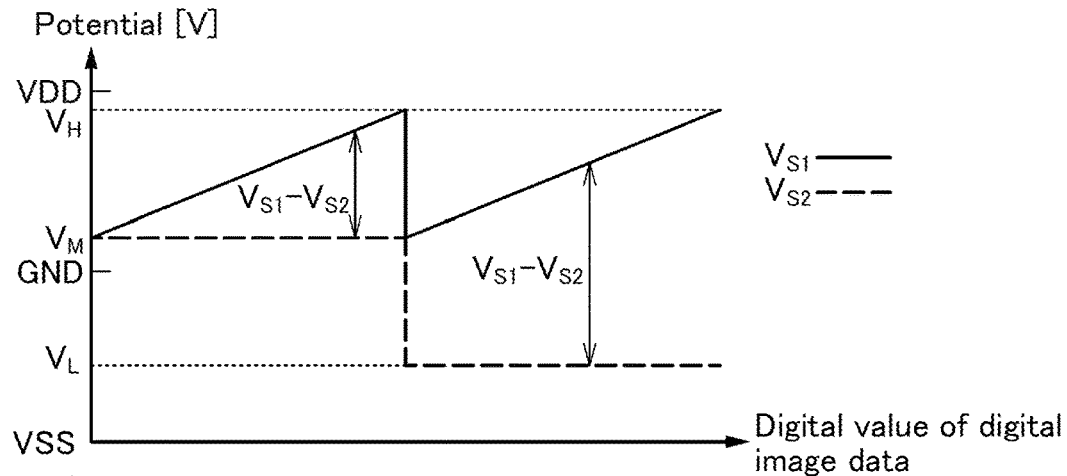
FIG. 3A2
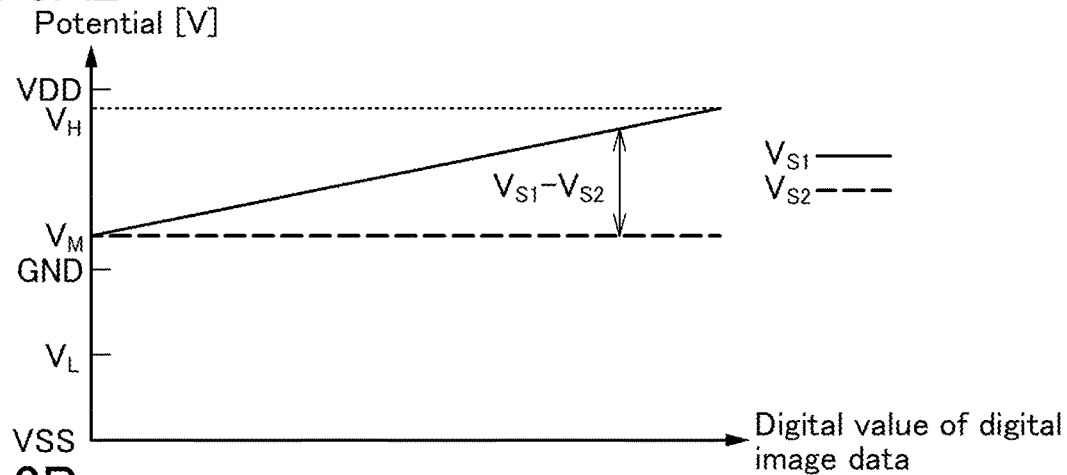
FIG. 3B
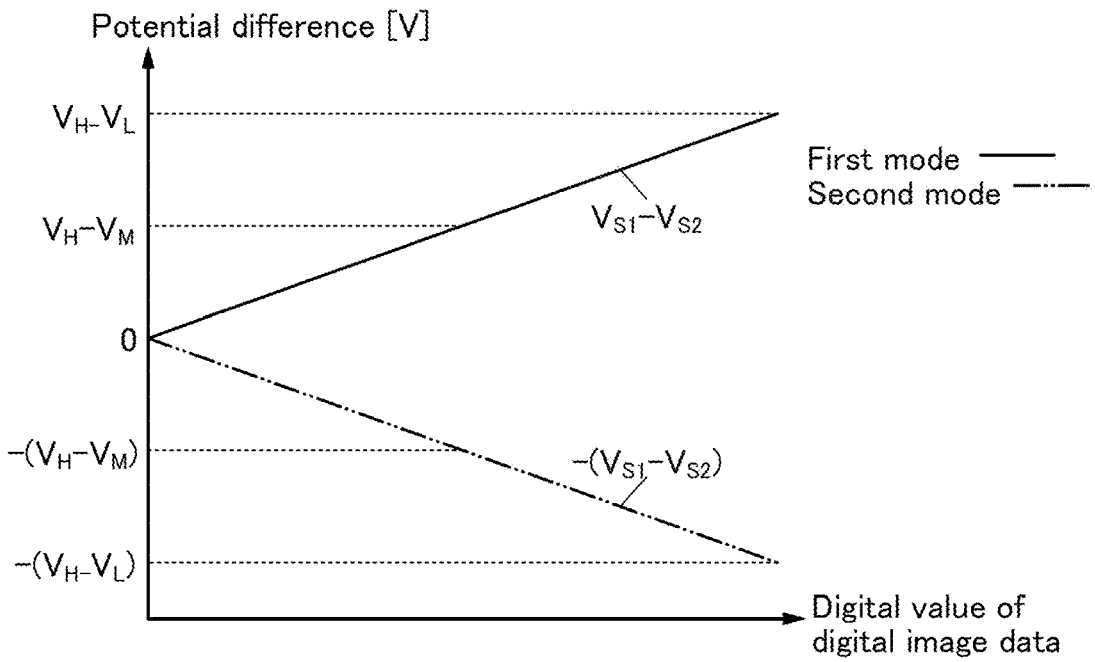

FIG. 7A1
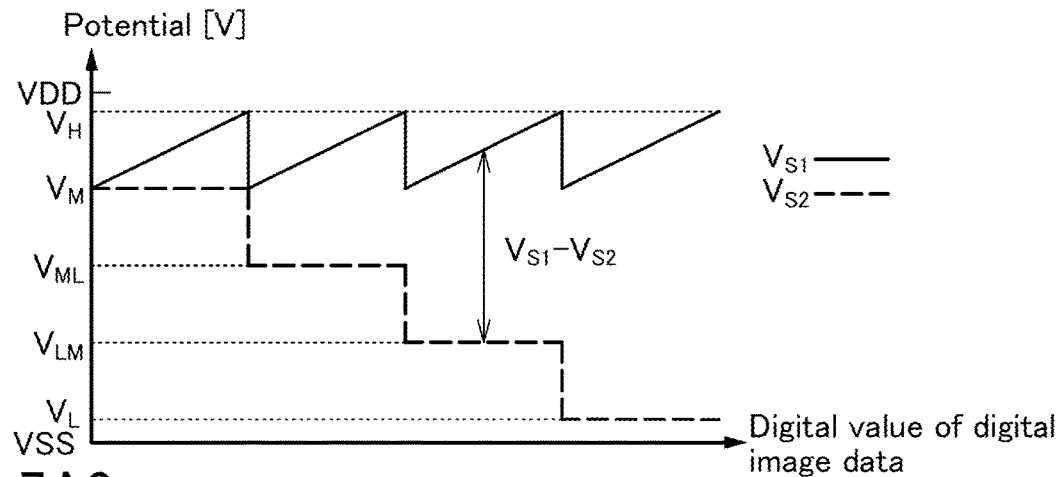
FIG. 7A2
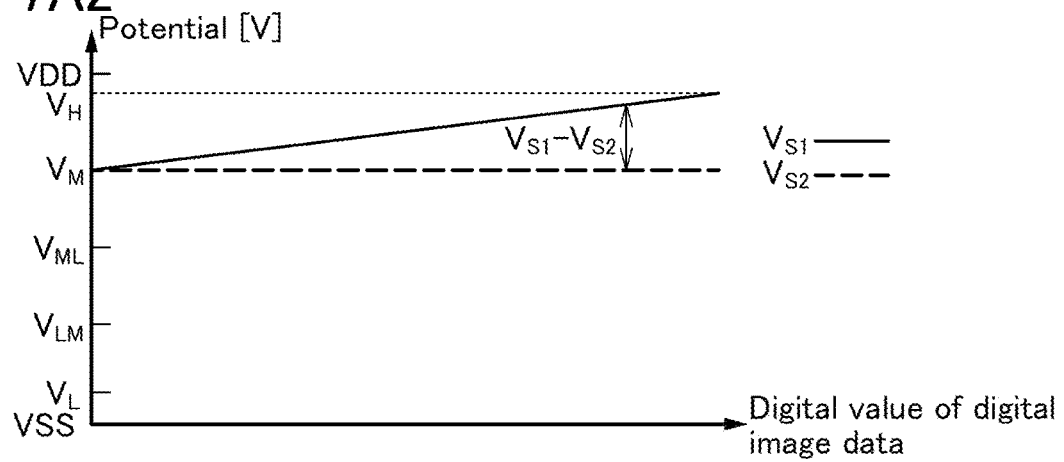
FIG. 7B
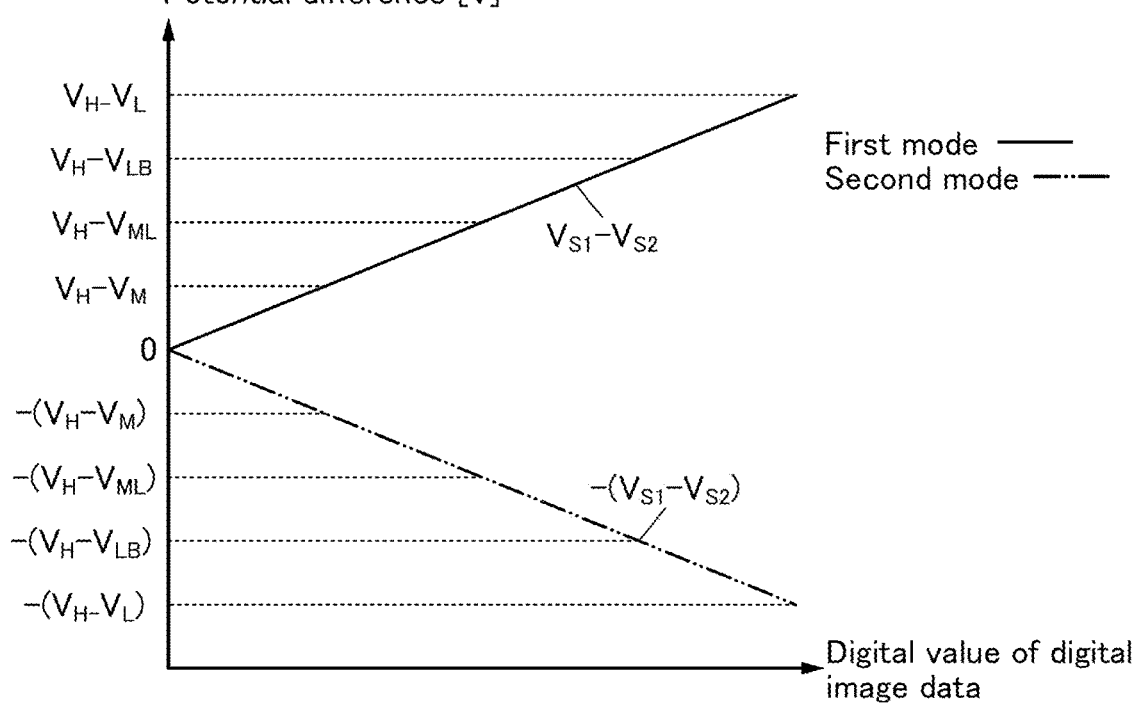

FIG. 16A1
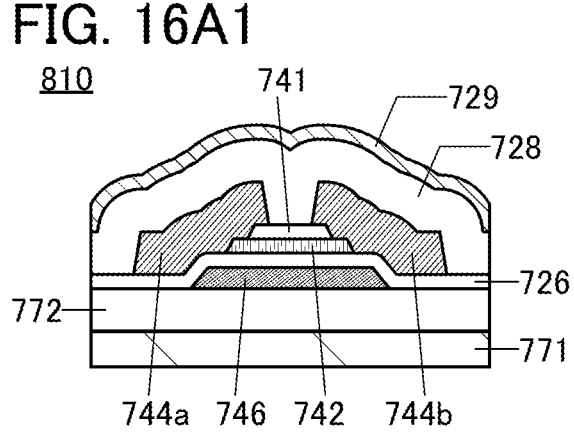
FIG. 16A2
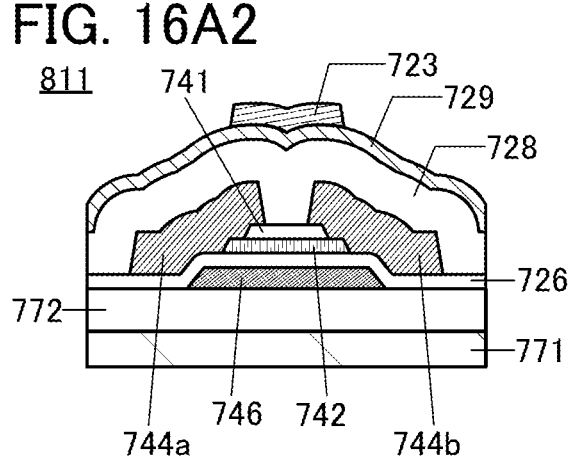
FIG. 16B1
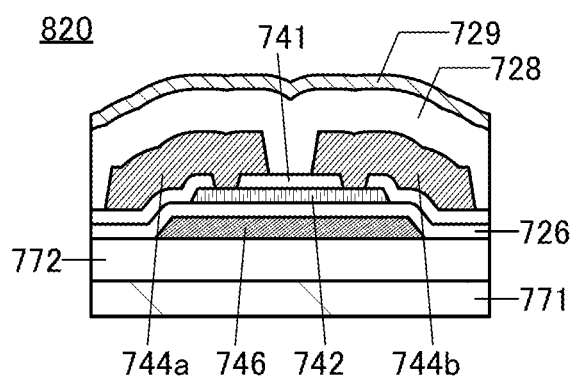
FIG. 16B2
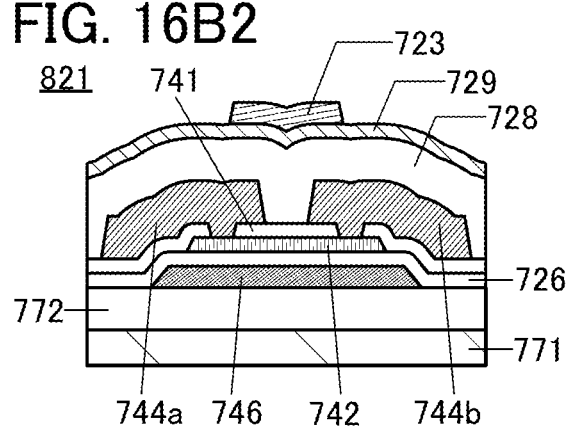
FIG. 16C1
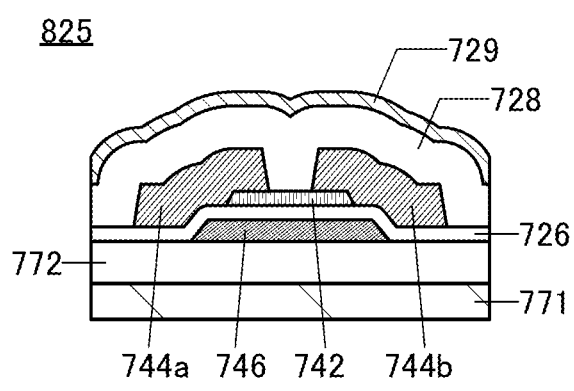
FIG. 16C2
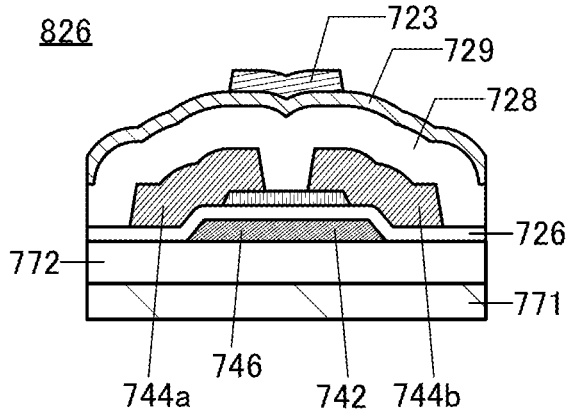

FIG. 17A1
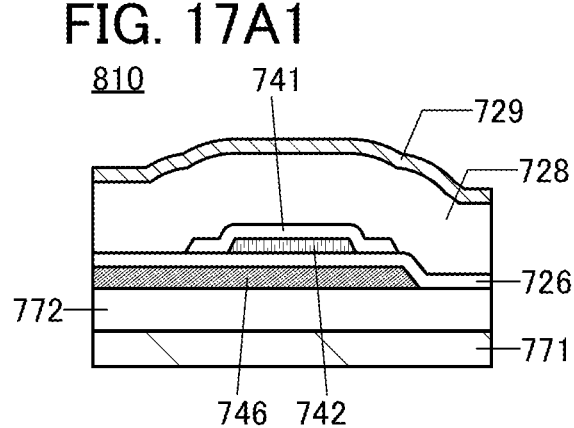
FIG. 17A2
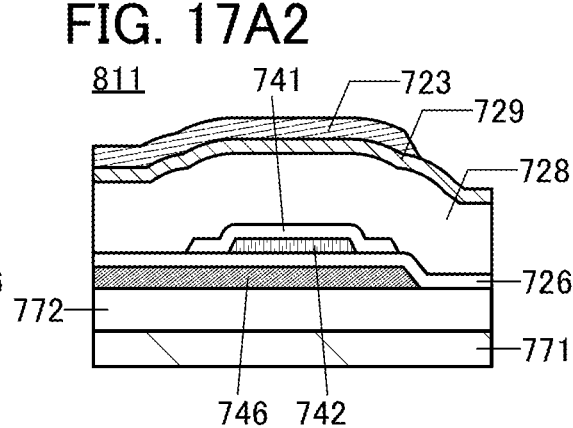
FIG. 17B1
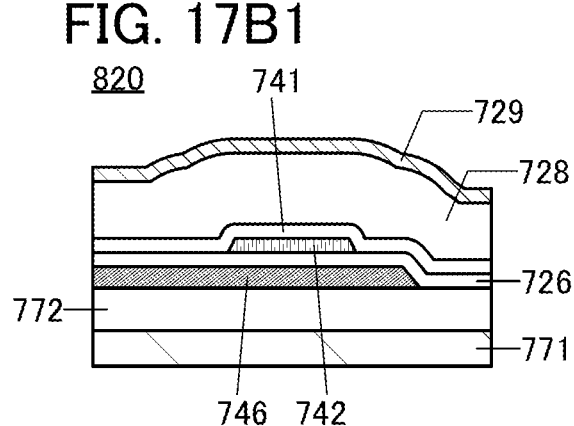
FIG. 17B2
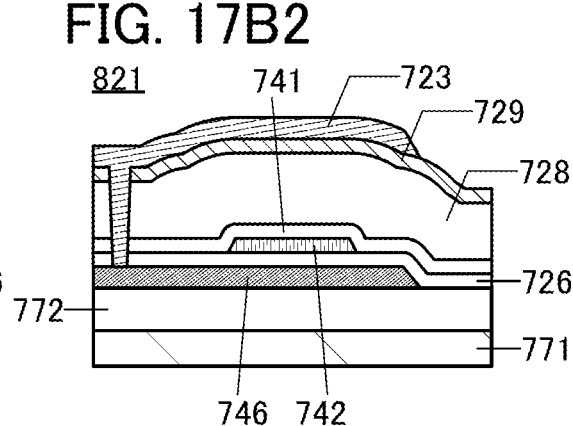
FIG. 17C1
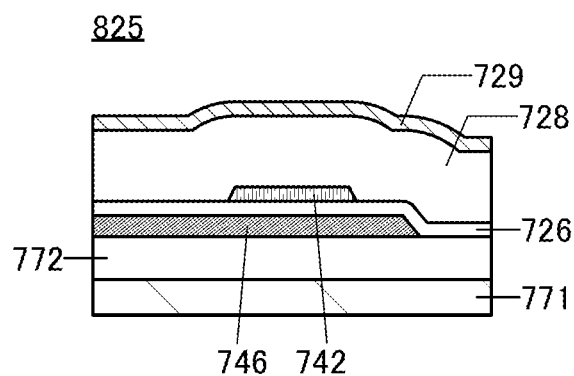
FIG. 17C2
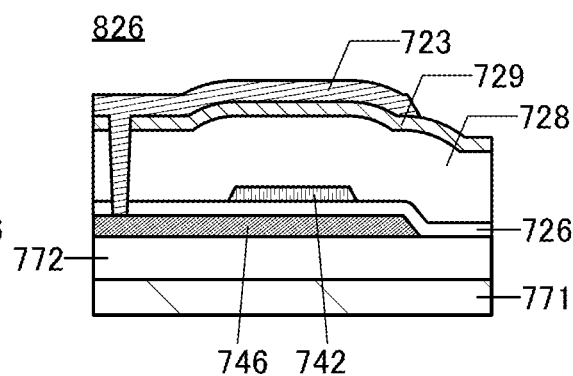

FIG. 18A1
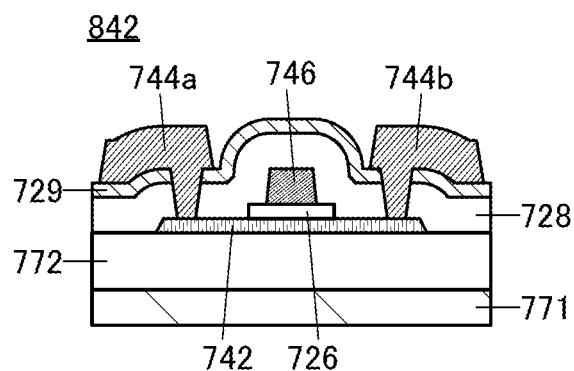
FIG. 18A2
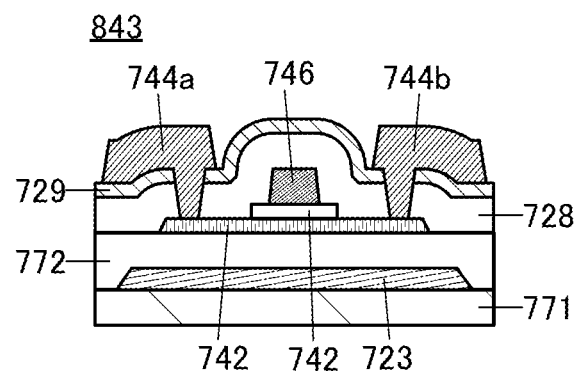
FIG. 18B1
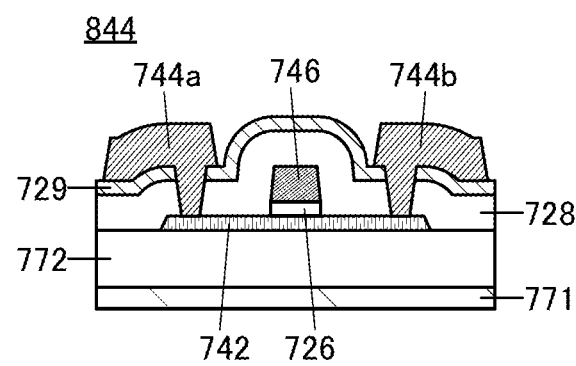
FIG. 18B2
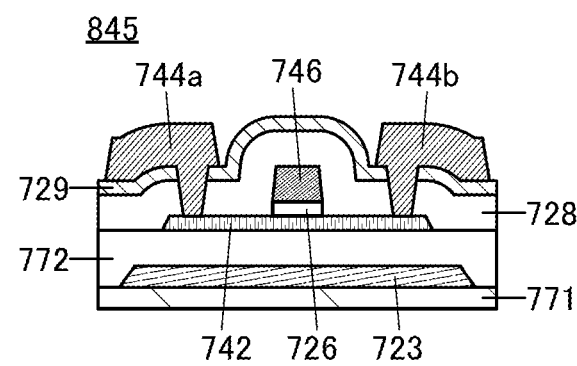
FIG. 18C1
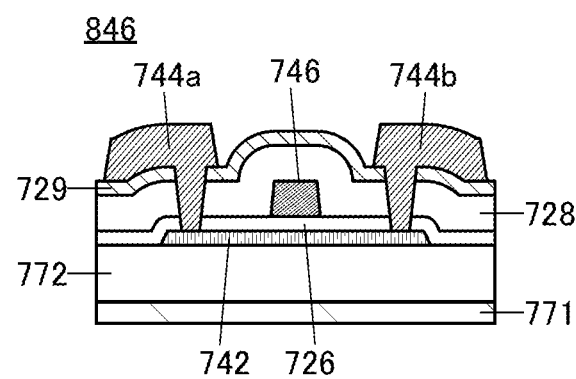
FIG. 18C2
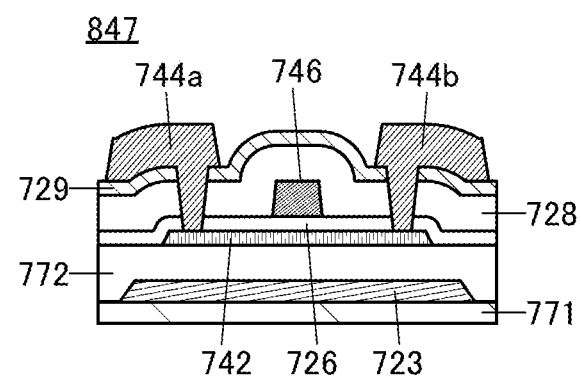

FIG. 19A1
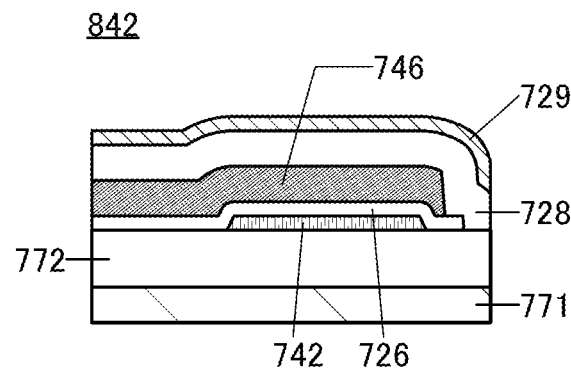
FIG. 19A2
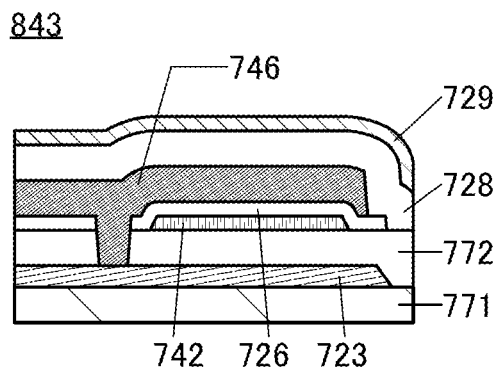
FIG. 19B1
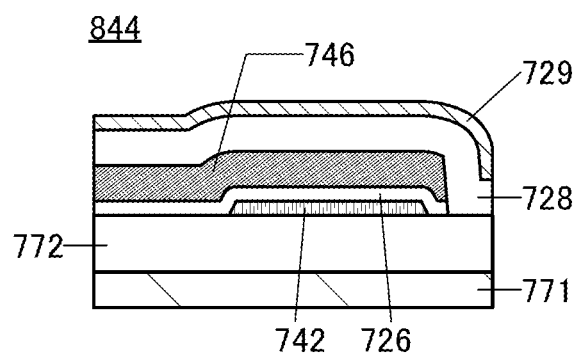
FIG. 19B2
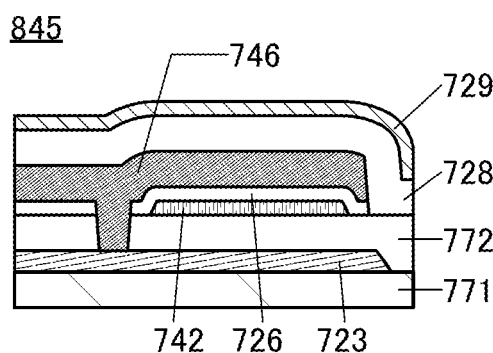
FIG. 19C1
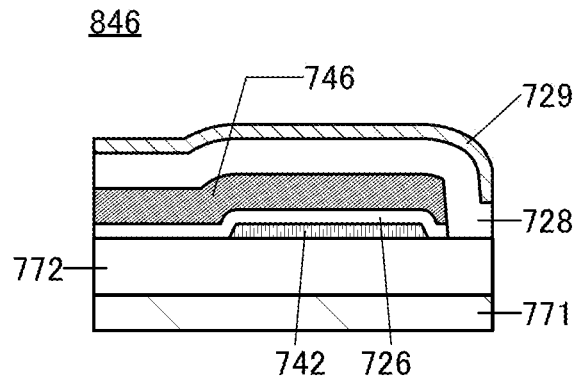
FIG. 19C2
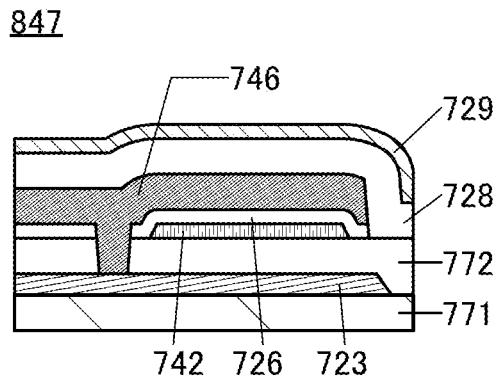

DISPLAY APPARATUS

This application is a continuation of copending U.S. application Ser. No. 17/837,711, filed on Jun. 10, 2022 which is a continuation of U.S. application Ser. No. 16/962,304, filed on Jul. 15, 2020 (now U.S. Pat. No. 11,360,363 issued Jun. 14, 2023) which is a 371 of international application PCT/IB2019/050112 filed on Jan. 8, 2019 which are all incorporated herein by reference.

TECHNICAL FIELD

One embodiment of the present invention relates to a display apparatus and an operation method thereof.

Note that one embodiment of the present invention is not limited to the above technical field. Examples of the technical field of one embodiment of the present invention include a semiconductor device, a display apparatus, a light-emitting device, a display system, an electronic device, a lighting device, an input device (e.g., a touch sensor), an input-output device (e.g., a touch panel), a driving method thereof, and a manufacturing method thereof.

In this specification and the like, a semiconductor device generally means a device that can function by utilizing semiconductor characteristics. A display apparatus (a liquid crystal display apparatus, a light-emitting display apparatus, and the like), a projection device, a lighting device, an electro-optical device, a power storage device, a memory device, a semiconductor circuit, an imaging device, an electronic device, and the like can be regarded as a semiconductor device, in some cases. Alternatively, it can be regarded that they include a semiconductor device, in some cases.

BACKGROUND ART

Patent Document 1 discloses a display apparatus with high withstand voltage in which a display device can be driven with a high voltage.

REFERENCE

Patent Document

[Patent Document 1]
   Japanese Published Patent Application No. 2011-227479

SUMMARY OF THE INVENTION

Problems to be Solved by the Invention

In order to drive a display device such as a liquid crystal device with a high voltage, a source driver circuit capable of outputting a high voltage is needed. However, such a source driver circuit occupies a large area and entails high costs.

An object of one embodiment of the present invention is to provide a display apparatus in which a high voltage can be supplied to a display device. An object of one embodiment of the present invention is to provide a small display apparatus. An object of one embodiment of the present invention is to provide an inexpensive display apparatus. An object of one embodiment of the present invention is to provide a display apparatus having low power consumption. An object of one embodiment of the present invention is to provide a highly reliable display apparatus. An object of one embodiment of the present invention is to provide a display apparatus having high display quality. An object of one embodiment of the present invention is to provide a novel display apparatus. An object of one embodiment of the present invention is to provide a method of operating the above display apparatus.

Note that the descriptions of these objects do not preclude the existence of other objects. One embodiment of the present invention does not need to achieve all the objects. Other objects can be derived from the descriptions of the specification, the drawings, and the claims.

Means for Solving the Problems

One embodiment of the present invention is a display apparatus including a first circuit, a second circuit, and a pixel. The first circuit has a function of generating digital image data including first data and second data. The second circuit is electrically connected to the pixel through a first wiring. The second circuit is electrically connected to the pixel through a second wiring. The second circuit has a function of setting a potential of the first wiring to one of a potential corresponding to the first data and a potential corresponding to the second data. The second circuit has a function of setting a potential of the second wiring to the other of the potential corresponding to the first data and the potential corresponding to the second data. The pixel includes a first transistor, a second transistor, a capacitor, and a display device. One of a source and a drain of the first transistor is electrically connected to one electrode of the capacitor. The one electrode of the capacitor is electrically connected to one electrode of the display device. One of a source and a drain of the second transistor is electrically connected to the other electrode of the capacitor. The other of the source and the drain of the first transistor is electrically connected to a first wiring. The other of the source and the drain of the second transistor is electrically connected to a second wiring. The display device has a function of displaying an image corresponding to the image data.

Alternatively, in the above embodiment, the second circuit may include a selection circuit. The selection circuit may include a first input terminal, a second input terminal, a first output terminal, and a second output terminal. The potential corresponding to the first data may be supplied to the first input terminal. The potential corresponding to the second data may be supplied to the second input terminal. The first output terminal may be electrically connected to the first wiring. The second output terminal may be electrically connected to the second wiring.

Alternatively, in the above embodiment, the second circuit may include a first switch and a second switch. The second input terminal may be electrically connected to one terminal of the first switch and one terminal of the second switch, wherein a first potential may be supplied to the other terminal of the first switch, wherein a second potential may be supplied to the other terminal of the second switch. The on/off of the first switch and the second switch may be controlled by the second data.

Alternatively, in the above embodiment, the second data may include information about the most significant bit of the digital image data.

Alternatively, in the above embodiment, the second circuit may be a source driver circuit.

Alternatively, in the above embodiment, the display device may be a liquid crystal device.

Alternatively, in the above embodiment, the display device may include a liquid crystal exhibiting a blue phase.

Alternatively, in the above embodiment, the first and second transistors may include a metal oxide in a channel formation region, and the metal oxide may include In, Zn, and M (M is Al, Ti, Ga, Sn, Y, Zr, La, Ce, Nd, or Hf).

Effect of the Invention

According to one embodiment of the present invention, a display apparatus in which a high voltage can be supplied to a display device can be provided. According to one embodiment of the present invention, a small display apparatus can be provided. According to one embodiment of the present invention, an inexpensive display apparatus can be provided. According to one embodiment of the present invention, a display apparatus having low power consumption can be provided. According to one embodiment of the present invention, a highly reliable display apparatus can be provided. According to one embodiment of the present invention, a display apparatus having high display quality can be provided. According to one embodiment of the present invention, a novel display apparatus can be provided. According to one embodiment of the present invention, a method of operating the above display apparatus can be provided.

Note that the descriptions of the effects do not preclude the existence of other effects. One embodiment of the present invention does not need to have all the effects. Other effects can be derived from the descriptions of the specification, the drawings, and the claims.

BRIEF DESCRIPTION OF THE DRAWINGS

FIGS. 3A1, 3A2, and 3B are diagrams showing operation examples of a display apparatus.

FIGS. 7A1, 7A2, and 7B are diagrams showing operation examples of a display apparatus.

FIGS. 16A1, 16A2, 16B1, 16B2, 16C1, and 16C2 are diagrams showing examples of transistors.

FIGS. 17A1, 17A2, 17B1, 17B2, 17C1, and 17C2 are diagrams showing examples of transistors.

FIGS. 18A1, 18A2, 18B1, 18B2, 18C1, and 18C2 are diagrams showing examples of transistors.

FIGS. 19A1, 19A2, 19B1, 19B2, 19C1, and 19C2 are diagrams showing examples of transistors.

MODE FOR CARRYING OUT THE INVENTION

Figure 1A:
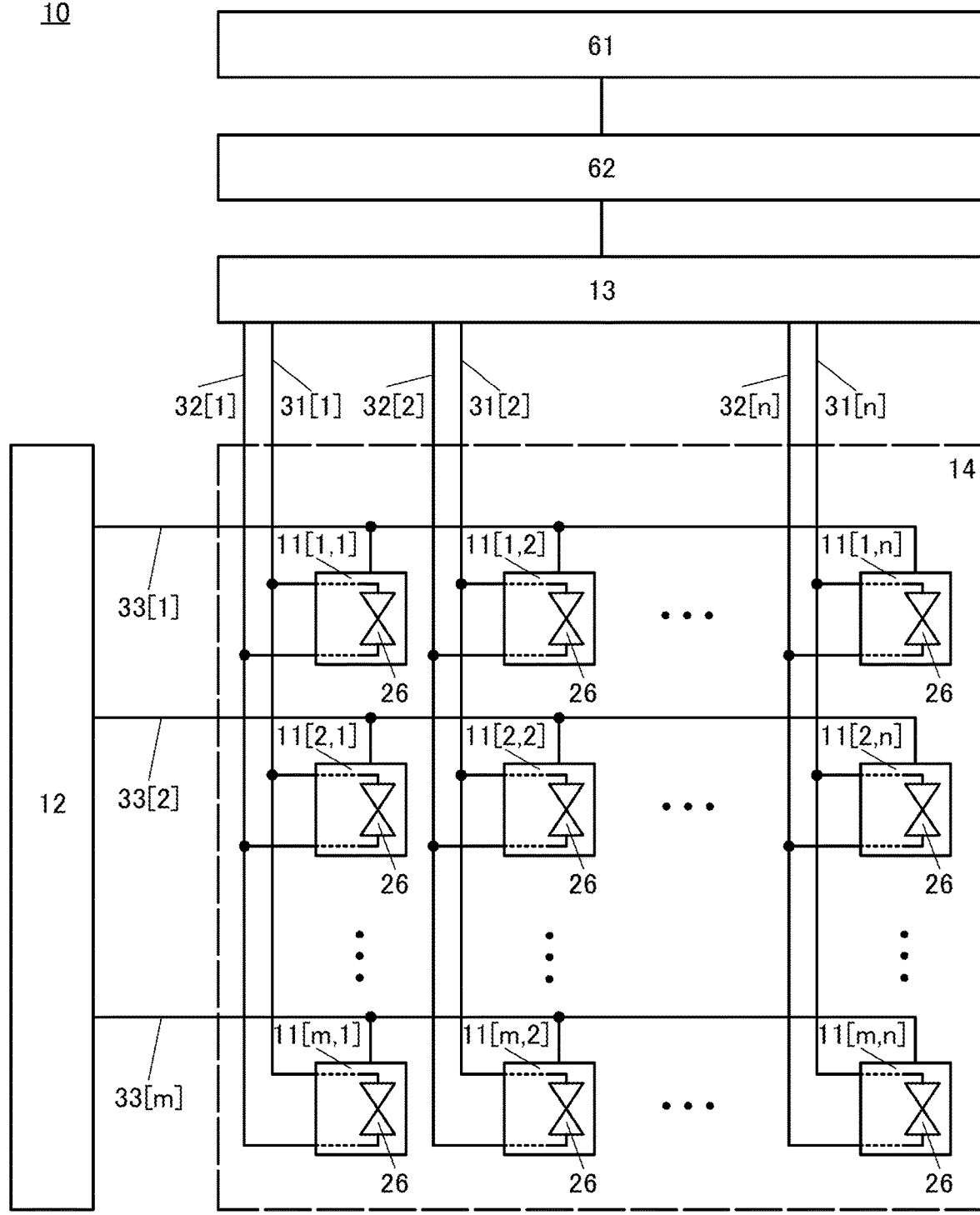
FIG. 1A is a diagram showing an example of a display apparatus.

Embodiments will be described in detail with reference to the drawings. Note that the present invention is not limited to the following description, and it will be readily appreciated by those skilled in the art that modes and details of the present invention can be modified in various ways without departing from the spirit and scope of the present invention. Thus, the present invention should not be construed as being limited to the descriptions in the following embodiments.

Note that in structures of the present invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

In addition, the position, size, range, or the like of each structure illustrated in drawings does not represent the actual position, size, range, or the like in some cases for easy understanding. Therefore, the disclosed invention is not necessarily limited to the position, size, range, or the like disclosed in the drawings.

Note that the term "film" and the term "layer" can be interchanged with each other depending on the case or circumstances. For example, the term "conductive layer" can be changed into the term "conductive film." As another example, the term "insulating film" can be changed into the term "insulating layer."

In this specification and the like, a metal oxide is an oxide of metal in a broad sense. Metal oxides are classified into an oxide insulator, an oxide conductor (including a transparent oxide conductor), an oxide semiconductor (also simply referred to as an OS), and the like. For example, in the case where a metal oxide is used in a semiconductor layer of a transistor, the metal oxide is referred to as an oxide semiconductor in some cases. That is, an OS transistor can also be called a transistor including a metal oxide or an oxide semiconductor.

In this specification and the like, metal oxides containing nitrogen are also collectively referred to as a metal oxide in some cases. A metal oxide containing nitrogen may be referred to as a metal oxynitride.

Embodiment 1

In this embodiment, a display apparatus of one embodiment of the present invention is described with reference to the drawings.

One embodiment of the present invention relates to a display apparatus including an image data generation circuit, a source driver circuit, and a pixel. The source driver circuit is electrically connected to the pixel through a first wiring and is electrically connected to the pixel through a second wiring. The pixel includes a display device, a potential of one electrode of the display device can be a potential of the first wiring, and a potential of the other electrode of the display device can be a potential of the second wiring. In other words, in the display apparatus of one embodiment of the present invention, a difference between the potential of the first wiring and the potential of the second wiring can be a voltage applied to the display device.

Here, the first and second wirings can be used as signal lines, and the display device can be a liquid crystal device.

In this specification and the like, the voltage applied to the display device refers to a potential difference between a potential supplied to one electrode of the display device and a potential supplied to the other electrode of the display device.

The image data generation circuit has a function of generating digital image data. The digital image data includes first data and second data. For example, in the case where the digital image data is 9-bit data, the low-order 8 bits can be the first data and the most significant bit can be the second data.

The display apparatus of one embodiment of the present invention can operate in a first mode or a second mode. In the first mode, the source driver circuit sets the potential of the first wiring to a potential corresponding to the first data and sets the potential of the second wiring to a potential corresponding to the second data. In the second mode, the source driver circuit sets the potential of the first wiring to the potential corresponding to the second data and sets the potential of the second wiring to the potential corresponding to the first data. In other words, the display apparatus of one embodiment of the present invention supplies image data to the pixel through both the first wiring and the second wiring. In addition, frame inversion driving can be performed by switching between the first mode and the second mode. Alternatively, source line inversion driving, gate line inversion driving, dot inversion driving, or the like can be performed.

For example, even when a potential supplied to the pixel by the source driver circuit is low, the voltage applied to the display device can be higher in the display apparatus of one embodiment of the present invention than in the case where image data is supplied to the pixel only through the first wiring. Thus, even in the case where a high voltage is applied to the display device, the power consumption of the display apparatus of one embodiment of the present invention can be reduced. Moreover, the display apparatus of one embodiment of the present invention can be downsized and inexpensive because an amplifier circuit included in the source driver circuit is not necessarily a high-voltage one.

1-1. Configuration Example 1 of Display Apparatus

FIG. 1(A) is a diagram showing a configuration example of a display apparatus 10 which is the display apparatus of one embodiment of the present invention. The display apparatus 10 includes a pixel array 14 in which pixels 11 are arranged in a matrix of m rows and n columns (m and n are integers greater than or equal to 2), a gate driver circuit 12, a source driver circuit 13, an image data generation circuit 61, and an image processing circuit 62. The pixel 11 includes a display device 26. For example, a liquid crystal device can be used as the display device 26.

The gate driver circuit 12 is electrically connected to the pixels 11 through m wirings 33. The source driver circuit 13 is electrically connected to the pixels 11 through n wirings 31 and n wirings 32. The image data generation circuit 61 is electrically connected to the image processing circuit 62, and the image processing circuit 62 is electrically connected to the source driver circuit 13.

In this specification and the like, the pixel 11 in an i-th row and a j-th column (i is an integer greater than or equal to 1 and less than or equal to m, and j is an integer greater than or equal to 1 and less than or equal to n) is denoted by a pixel 11[$i, j$]. The wiring 33 electrically connected to the pixels 11 in the i-th row is denoted by a wiring 33[$i$], and the wiring 31 and the wiring 32 electrically connected to the pixels 11 in the j-th column are denoted by a wiring 31[$j$] and a wiring 32[$j$], respectively.

A potential of one electrode of the display device 26 included in each pixel 11 in the j-th column can be a potential of the wiring 31[$j$]. A potential of the other electrode of the display device 26 included in each pixel 11 in the j-th column can be a potential of the wiring 32[$j$]. In other words, in the display apparatus 10, a difference between the potential of the wiring 31[$j$] and the potential of the wiring 32[$j$] can be a voltage applied to the display device 26 included in each pixel 11 in the j-th column.

Figure 1B:
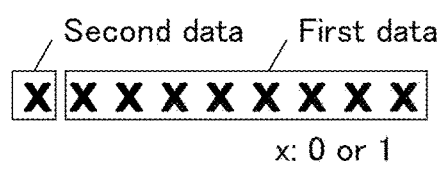
FIG. 1B is a diagram showing image data.

The image data generation circuit 61 has a function of generating digital image data corresponding to an image to be displayed on the pixel array 14. FIG. 1(B) is a diagram showing the digital image data input to the source driver circuit 13. As shown in FIG. 1(B), the digital image data includes first data and second data. For example, in the case where the digital image data is 9-bit data, the low-order 8 bits can be the first data and the most significant bit can be the second data. For example, in the case where the digital image data is 10-bit data, the low-order 8 bits can be the first data and the high-order 2 bits can be the second data. In other words, the second data can be data including information about the most significant bit.

The image processing circuit 62 has a function of performing image processing such as gamma correction, dimming, toning, noise removal, distortion correction, coding, and composition on the digital image data input to the source driver circuit 13.

The gate driver circuit 12 has a function of generating a selection signal that is a signal for selecting the pixel 11 and supplying the selection signal to the pixel 11 through the wiring 33. The potential of the wiring 33 becomes a potential corresponding to the selection signal generated by the gate driver circuit 12. That is, the wiring 33 has a function of a scan line.

The source driver circuit 13 has a function of performing digital-analog conversion (hereinafter, DA conversion) of the first data in the digital image data input to the source driver circuit 13 and then outputting the data to one of the wiring 31 and the wiring 32. Furthermore, the source driver circuit 13 has a function of outputting a potential corresponding to the second data in the digital image data input to the source driver circuit 13 to the other of the wiring 31 and the wiring 32. According to the above, the source driver circuit 13 can be said to have a function of setting the potential of one of the wiring 31 and the wiring 32 to a potential corresponding to the first data and setting the potential of the other of the wiring 31 and the wiring 32 to the potential corresponding to the second data. In addition, the wiring 31 and the wiring 32 have a function of signal lines.

In this specification and the like, the first mode refers to an operation mode in which the potential of the wiring 31 is set to the potential corresponding to the first data and the potential of the wiring 32 is set to the potential corresponding to the second data. In addition, a second mode refers to an operation mode in which the potential of the wiring 32 is set to the potential corresponding to the first data and the potential of the wiring 31 is set to the potential corresponding to the second data. In other words, the first mode and the second mode are switched, whereby the voltage applied to the display device 26 is inverted, and frame inversion driving or the like is performed. Thus, when the display device 26 is a liquid crystal device, deterioration of the display device 26 can be more inhibited in the above case than in the case where frame inversion driving or the like is not performed; accordingly, the display apparatus 10 can have higher reliability.

Figure 2A:
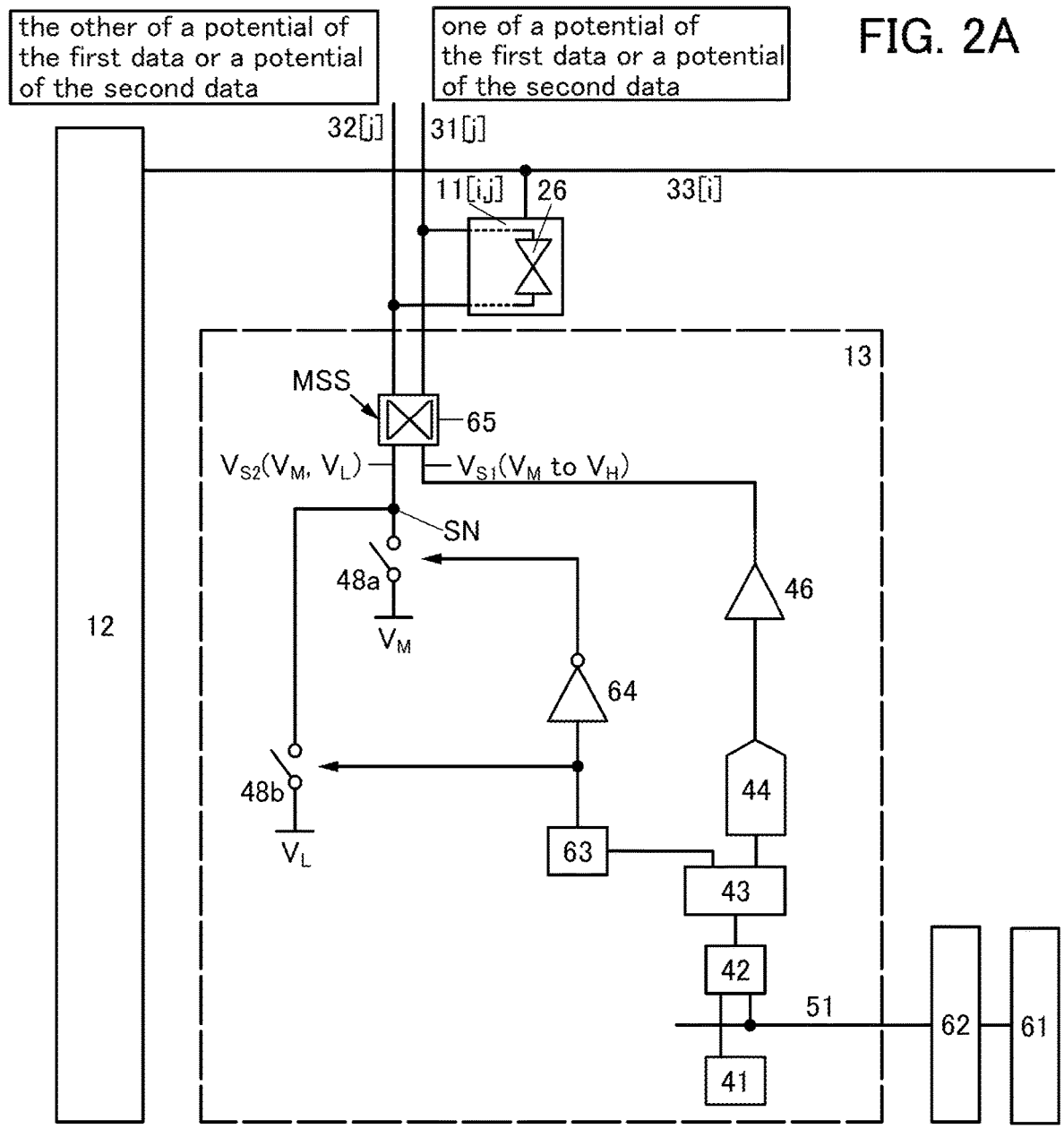
FIG. 2A is a diagram showing an example of a display apparatus.

FIG. 2(A) is a diagram showing a specific configuration example of the source driver circuit 13. Note that FIG. 2(A) illustrates the pixel 11[$i$, $j$], the gate driver circuit 12, the image data generation circuit 61, and the image processing circuit 62 in addition to the source driver circuit 13.

The source driver circuit 13 includes a shift register 41, a latch circuit 42, a level shift circuit 43, a DA converter circuit 44, an amplifier circuit 46, a level shift circuit 63, an inverter circuit 64, a switch 48$a$, a switch 48$b$, and a selection circuit 65. As the switch 48$a$ and the switch 48$b$, a CMOS transistor, an n-channel transistor, or a p-channel transistor can be used, for example.

An output terminal of the image processing circuit 62 is electrically connected to an input terminal of the latch circuit 42 through a data bus wiring 51. An output terminal of the shift register 41 is electrically connected to a clock input terminal of the latch circuit 42. An output terminal of the latch circuit 42 is electrically connected to an input terminal of the level shift circuit 43. An output terminal of the level shift circuit 43 is electrically connected to an input terminal of the DA converter circuit 44 and an input terminal of the level shift circuit 63. An output terminal of the DA converter circuit 44 is electrically connected to an input terminal of the amplifier circuit 46. An output terminal of the level shift circuit 63 is electrically connected to an input terminal of the inverter circuit 64.

A first input terminal of the selection circuit 65 is electrically connected to an output terminal of the amplifier circuit 46. A second input terminal of the selection circuit 65 is electrically connected to one terminal of the switch 48$a$ and one terminal of the switch 48$b$. Here, a connection portion of wirings where the second input terminal of the selection circuit 65, one terminal of the switch 48$a$, and the other terminal of the switch 48$b$ are connected is a node SN.

The on/off of the switch 48$a$ can be controlled by a signal output from the inverter circuit 64. The on/off of the switch 48$b$ can be controlled by a signal output from the level shift circuit 63.

The digital image data corresponding to an image to be displayed on the pixel array 14 is input to the input terminal of the latch circuit 42 through the data bus wiring 51. The latch circuit 42 has a function of retaining the digital image data or outputting the retained digital image data in response to a signal supplied from the shift register 41.

The level shift circuit 43 has a function of converting the amplitude voltage of the input digital image data into a high level voltage or a low level voltage. Specifically, the level shift circuit 43 has a function of converting the amplitude voltage of the digital image data supplied from the latch circuit 42 into an amplitude voltage at which the DA converter circuit 44 operates properly.

The DA converter circuit 44 has a function of converting the first data into analog data on the basis of the digital value of the first data included in the digital image data. Here, the potential that can be output by the DA converter circuit 44 is assumed to be a potential from $V_M$ to $V_H$. The potential $V_M$ can be a potential higher than or equal to a ground potential, for example, and the potential $V_H$ can be a potential higher than the potential $V_M$, for example.

Figure 2B:
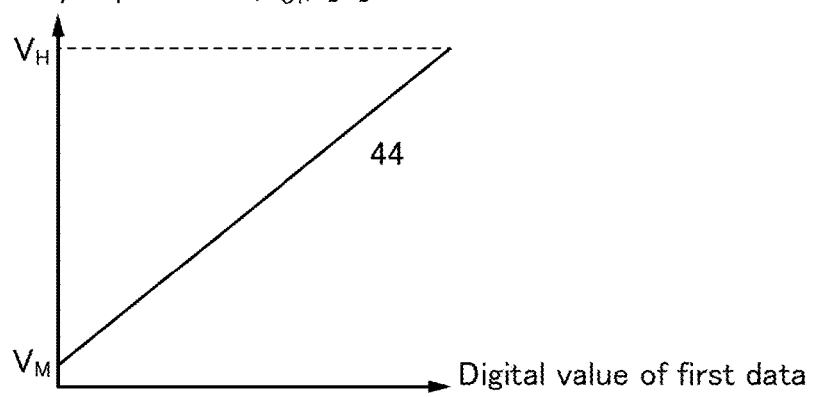
FIG. 2B is a diagram showing an example of characteristics of a DA converter circuit.

FIG. 2(B) shows a relationship between an output potential and the digital value of the input first data of the DA converter circuit 44. In the DA converter circuit 44, the larger the digital value of the input first data is, the higher the output potential is as shown in FIG. 2(B). For example, in the case where the number of bits of the first data is 8 bits, the DA converter circuit 44 can output the potential $V_M$ when the digital value of the first data input to the DA converter circuit 44 is 0 in decimal notation, and the DA converter circuit 44 can output the potential $V_H$ when the digital value is 255 in decimal notation. Note that the output potential of the DA converter circuit 44 may be lower as the digital value of the input first data becomes larger. For example, in the case where the number of bits of the first data is 8 bits, the DA converter circuit 44 may output the potential $V_H$ when the digital value of the first data input to the DA converter circuit 44 is 0 in decimal notation, and the DA converter circuit 44 may output the potential $V_M$ when the digital value is 255 in decimal notation. Note that as shown in FIG. 2(B), the relationship between the output potential and the digital value of the input first data of the DA converter circuit 44 is preferably linear but is not necessarily linear. For example, a curve having no extremal value is possible.

The amplifier circuit 46 has a function of amplifying analog data input to the input terminal and outputting it to the output terminal. Providing the amplifier circuit 46 allows the potential corresponding to the first data to be stably supplied to the pixel 11. As the amplifier circuit 46, a voltage follower circuit including an operational amplifier and the like can be used, for example. Note that in the case where a circuit including a differential input circuit is used as the amplifier circuit, the offset voltage of the differential input circuit is preferably set as close to 0 V as possible.

Here, when the potential output from the amplifier circuit 46 is referred to as a potential $V_{S1}$, the potential $V_{S1}$ can be said to be the potential corresponding to the first data. In addition, the potential of the potential $V_{S1}$ can be set to the potential from $V_M$ to $V_H$.

The level shift circuit 63 has a function of outputting a signal obtained by conversion of the amplitude voltage of the second data included in the digital image data into a high level voltage or a low level voltage. Specifically, the level shift circuit 63 has a function of converting the amplitude voltage of the second data included in the digital image data supplied from the level shift circuit 43 into an amplitude voltage at which the switch 48$a$ and the switch 48$b$ operate properly. For example, in the case where the number of bits of the second data is one bit as shown in FIG. 1(B), the level shift circuit 63 has a function of converting the amplitude voltage of the second data such that the switch 48$b$ is turned on and the switch 48$a$ is turned off when the value of the second data is "1" and the switch 48$a$ is turned on and the switch 48$b$ is turned off when the value of the second data is "0." Note that the switch 48$a$ may be turned on and the switch 48$b$ may be turned off when the value of the second data is "1," and the switch 48$b$ may be turned on and the switch 48$a$ may be turned off when the value of the second data is "0."

The inverter circuit 64 has a function of inverting the value of the signal output from the level shift circuit 63. That is, the inverter circuit 64 has a function of inverting the value of the second data. For example, the inverter circuit 64 has a function of outputting a signal whose value is "0" when the value of the second data is "1" and outputting a signal whose value is "1" when the value of the second data is "0." Thus, when the switch 48$b$ is on, the switch 48$a$ can be off, and when the switch 48$b$ is off, the switch 48$a$ can be on.

For example, the potential $V_M$ can be applied to the other terminal of the switch 48$a$. For example, a potential $V_L$ can be applied to the other terminal of the switch 48$b$. For example, the potential $V_L$ here can be a potential lower than the potential $V_M$. For example, the potential $V_L$ can be a negative potential. Note that the potential $V_L$ may be applied to the other terminal of the switch 48a and the potential $V_M$ may be applied to the other terminal of the switch 48b. Alternatively, the potential of the potential $V_{S1}$ may be set to the potential from $V_L$ to $V_M$, and the potential $V_H$ may be applied to the other terminal of the switch 48a or the other terminal of the switch 48b.

Accordingly, the potential of the node SN can be the potential corresponding to the second data. Here, when the potential of the node SN is referred to as a potential $V_{S2}$, the potential $V_{S2}$ can be said to be the potential corresponding to the second data. In addition, the second data can be the potential $V_M$ or the potential $V_L$, for example.

The potential $V_{S1}$ is supplied to the first input terminal of the selection circuit 65, and the potential $V_{S2}$ is supplied to the second input terminal of the selection circuit 65. The selection circuit 65 has a function of selecting a wiring through which the potential $V_{S1}$ is output and a wiring through which the potential $V_{S2}$ is output. Specifically, when the display apparatus 10 operates in the first mode, the potential $V_{S1}$ is output to the wiring 31[j] and the potential $V_{S2}$ is output to the wiring 32[j]. Meanwhile, when the display apparatus 10 operates in the second mode, the potential $V_{S1}$ is output to the wiring 32[j] and the potential $V_{S2}$ is output to the wiring 31[j]. In other words, the selection circuit 65 can be said to have a function of performing frame inversion driving or the like.

A mode switching signal MSS is supplied to the switching circuit 65. The mode switching signal MSS has a function of controlling the operation of the selection circuit 65. The mode switching signal MSS can be a 1-bit digital signal, for example. When the value of the mode switching signal MSS is "1," for example, the selection circuit 65 can output the potential $V_{S1}$ to the wiring 31[j] and output the potential $V_{S2}$ to the wiring 32[j]. For example, when the value of the mode switching signal MSS is "0," the selection circuit 65 can output the potential $V_{S1}$ to the wiring 32[j] and output the potential $V_{S2}$ to the wiring 31[j]. In other words, for example, the display apparatus 10 operates in the first mode when the value of the mode switching signal MSS is set to "1," and the display apparatus 10 operates in the second mode when the value of the mode switching signal MSS is set to "0." Note that, for example, the display apparatus 10 may operate in the first mode when the value of the mode switching signal MSS is set to "0," and the display apparatus 10 may operate in the second mode when the value of the mode switching signal MSS is set to "1."

FIGS. 3(A1) and 3(A2) are diagrams showing a relationship of the potential $V_{S1}$ and the potential $V_{S2}$ to the digital value of the digital image data input to the source driver circuit 13. Here, the second data is the most significant bit of the digital image data as shown in FIG. 1(B). In FIG. 3(A1), the source driver circuit 13 is assumed to have the configuration shown in FIG. 2(A), and the potential $V_{S2}$ is set to the potential $V_M$ when the value of the second data is "0" and the potential $V_{S2}$ is set to the potential $V_L$ when the value of the second data is "1." By contrast, in FIG. 3(A2), the potential $V_{S2}$ is set to the potential $V_M$ regardless of the value of the second data.

In FIG. 3(A1), the maximum value of the difference between the potential $V_{S1}$ and the potential $V_{S2}$ can be a potential "$V_H-V_L$." By contrast, in FIG. 3(A2), the maximum value of the difference between the potential $V_{S1}$ and the potential $V_{S2}$ is a potential "$V_H-V_M$." In other words, when the range of the potentials the DA converter circuit 44 can output, i.e., the range of possible potentials $V_{S1}$, in FIG. 3(A1) is the same as that in FIG. 3(A2), the maximum value of the difference between the potential $V_{S1}$ and the potential $V_{S2}$ can be larger in the case shown in FIG. 3(A1) than that in the case shown in FIG. 3(A2). Therefore the voltage applied to the display device 26 can be high even when the potential $V_{S1}$ is low. Thus, even in the case where a high voltage is applied to the display device 26, the power consumption of the display apparatus 10 can be reduced. Moreover, the display apparatus 10 can be downsized and inexpensive because the amplifier circuit 46 is not necessarily a high-voltage one.

FIG. 3(B) is a diagram showing a relationship of a difference between the potential of the wiring 31 and the potential of the wiring 32 to the digital value of the digital image data input to the source driver circuit 13 in the first mode and the second mode. As shown in FIG. 3(B), the difference between the potential of the wiring 31 and the potential of the wiring 32 is a potential "$V_{S1}-V_{S2}$" in the first mode and a potential "$-(V_{S1}-V_{S2})$" in the second mode. Thus, when the first mode and the second mode are switched, the voltage applied to the display device 26 is inverted and frame inversion driving or the like can be performed.

1-2. Configuration Example 2 of Display Apparatus

Figure 4:
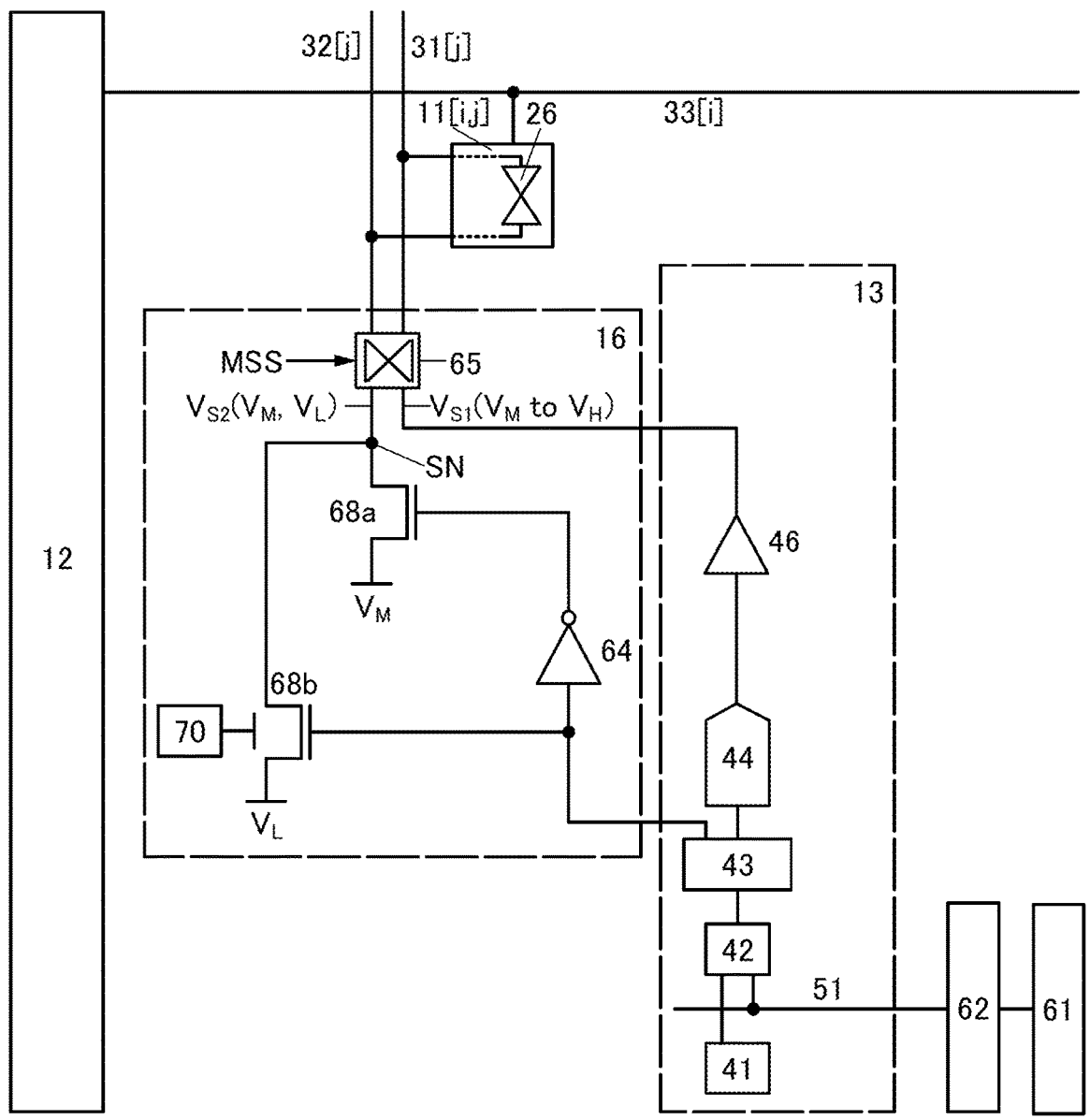
FIG. 4 is a diagram showing an example of a display apparatus.

Although the level shift circuit 63, the inverter circuit 64, the switch 48a, the switch 48b, and the selection circuit 65 are provided in the source driver circuit 13 in the configuration in FIG. 2(A), they are not necessarily provided in the source driver circuit 13. FIG. 4 is a modification example of the configuration shown in FIG. 2(A), and the inverter circuit 64 and the selection circuit 65 are provided in a switch circuit 16 which is a circuit different from the source driver circuit 13. In the switch circuit 16, a transistor 68a is provided as the switch 48a and a transistor 68b is provided as the switch 48b. Note that the level shift circuit 63 is provided in neither the source driver circuit 13 nor the switch circuit 16. In addition, a potential generation circuit 70 is provided in the switch circuit 16.

As the transistor 68a and the transistor 68b, a CMOS transistor, an n-channel transistor, or a p-channel transistor can be used, for example. The case where n-channel transistors are used as the transistor 68a and the transistor 68b is described below; the following description can be referred to even for the case where the other transistors are used.

The output terminal of the level shift circuit 43 is electrically connected to the input terminal of the inverter circuit 64 and a gate of the transistor 68b in addition to the input terminal of the DA converter circuit 44. An output terminal of the inverter circuit 64 is electrically connected to a gate of the transistor 68a.

The first input terminal of the selection circuit 65 is electrically connected to the output terminal of the amplifier circuit 46 as shown in FIG. 2(A). The second input terminal of the selection circuit 65 is electrically connected to one of a source and a drain of the transistor 68a and one of a source and a drain of the transistor 68b. Here, a connection portion of wirings where the second input terminal of the selection circuit 65, one of the source and the drain of the transistor 68a, and one of the source and the drain of the transistor 68b are connected is the node SN.

For example, the potential $V_M$ can be applied to the other of the source and the drain of the transistor 68a. For example, the potential $V_L$ can be applied to the other of the source and the drain of the transistor 68b.

In addition to the gate, a back gate is provided for the transistor 68b. The potential generation circuit 70 is electrically connected to the back gate. The potential generation circuit 70 has a function of generating a predetermined potential. The potential generated by the potential generation circuit 70 can be supplied to the back gate of the transistor 68b. Thus, the threshold voltage of the transistor 68b can be controlled. For example, the potential generation circuit 70 generates a negative potential and the potential is supplied to the back gate of the transistor 68b, whereby the threshold voltage of the transistor 68b can be shifted in the positive direction.

In this specification, a simple term "gate" may mean a front gate or may mean both of a front gate and a back gate.

In the case of not providing a back gate for the transistor 68b, when the threshold voltage of the transistor 68b is 0 V, for example, the potential of the gate of the transistor 68b needs to be lower than or equal to the potential $V_L$ in order that the transistor 68b be turned off. However, if the source driver circuit 13 cannot output a potential lower than or equal to the potential $V_L$, for example, if the potential $V_L$ is a negative potential and the source driver circuit 13 cannot output a negative potential, the transistor 68b cannot be turned off. Even in such a case, the transistor 68b can be turned off when the potential generation circuit 70 supplies a negative potential to the back gate of the transistor 68b to shift the threshold voltage of the transistor 68b in the positive direction. Note that the transistor 68a may include a back gate. Alternatively, a configuration may be employed in which the switch circuit 16 includes the level shift circuit 63 shown in FIG. 2(A). In this case, the back gate is not necessarily provided for the transistor 68b, and the potential generation circuit 70 is not necessarily provided.

Transistors including a metal oxide in channel formation regions (hereinafter, OS transistors) can be used as the transistor 68a and the transistor 68b. An OS transistor is characterized by high withstand voltage. Therefore high potentials can be applied to the sources, drains, and gates of the transistor 68a and the transistor 68b. An OS transistor is particularly preferably used as the transistor 68b, in which case the potential $V_L$ can be a lower potential, i.e., a potential with a larger absolute value.

Alternatively, transistors including silicon in channel formation regions (hereinafter, Si transistors) can be used as the transistor 68a and the transistor 68b. Note that as Si transistors, a transistor including amorphous silicon, a transistor including crystalline silicon (typically, low-temperature polysilicon), a transistor including single crystal silicon, and the like are given. Since a Si transistor has a high on-state current, the potential of the node SN can be determined quickly in the case where the potential of the potential $V_{S2}$ is changed.

Note that a configuration in which the transistor 68a includes a back gate and the potential generation circuit 70 is electrically connected to the back gate is preferred in the case where the potential $V_L$ is supplied to the other of the source and the drain of the transistor 68a.

1-3. Configuration Example 3 of Display Apparatus

Figure 5A:
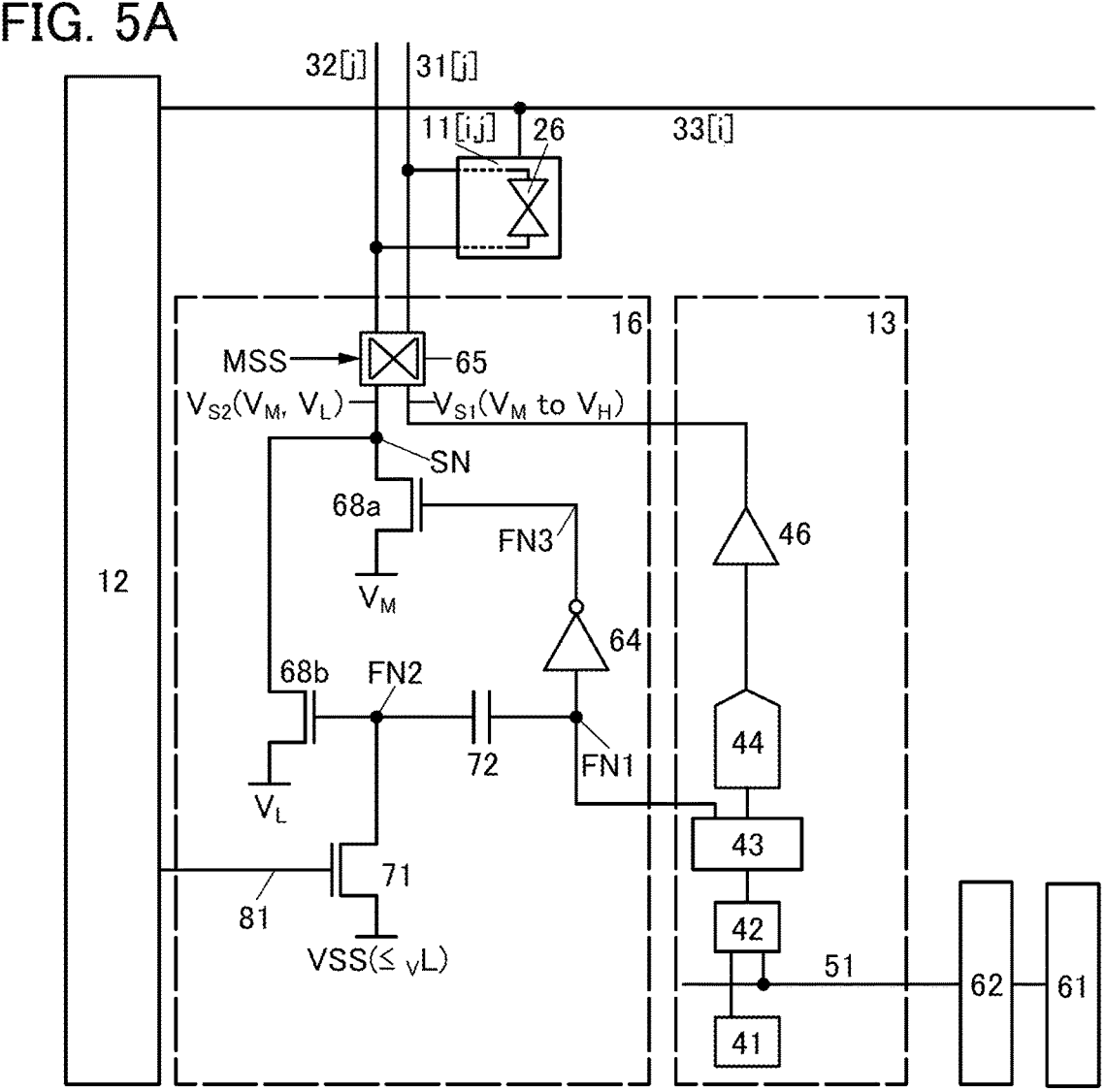
FIG. 5A is a diagram showing an example of a display apparatus.

FIG. 5(A) is a modification example of the configuration shown in FIG. 4, which is different from the configuration shown in FIG. 4 in that the switch circuit 16 does not include the potential generation circuit 70 and the switch circuit 16 includes a transistor 71 and a capacitor 72. Note that although each of the transistor 68a, the transistor 68b, and the transistor 71 does not include a back gate in the configuration in FIG. 5(A), a configuration may be employed in which some or all of the transistors include a back gate. A potential generation circuit may be electrically connected to the back gate and the potential of the back gate may be changed. The gate and the back gate may be electrically connected to each other so that the potential of the back gate may be equal to the potential of the gate.

As the transistor 71, for example, a CMOS transistor, an n-channel transistor, or a p-channel transistor can be used as in the case of the transistor 68a and the transistor 68b. The case where an n-channel transistor is used as the transistor 71 is described below; the following description can be referred to even for the case where the other transistor is used.

The output terminal of the level shift circuit 43 is electrically connected to one electrode of the capacitor 72 in addition to the input terminal of the DA converter circuit 44 and the input terminal of the inverter circuit 64. The gate of the transistor 68b is electrically connected to one of a source and a drain of the transistor 71 and the other electrode of the capacitor 72. A gate of the transistor 71 is electrically connected to the gate driver circuit 12 through a wiring 81. Here, a wiring to which the input terminal of the DA converter circuit 44, the input terminal of the inverter circuit 64, and one electrode of the capacitor 72 are connected is anode FN1. In addition, a wiring to which the gate of the transistor 68b, one of the source and the drain of the transistor 71, and the other electrode of the capacitor 72 are connected is a node FN2. Furthermore, a connection portion of wirings where the output terminal of the inverter circuit 64 and the gate of the transistor 68a are connected is a node FN3.

A potential VSS can be applied to the other of the source and the drain of the transistor 71, for example. The potential VSS can be a potential lower than or equal to the potential $V_L$.

When the switch circuit 16 has the configuration shown in FIG. 5(A), the gate driver circuit 12 has a function of controlling the conduction/non-conduction of the transistor 71 by controlling the potential of the wiring 81.

Figure 5B:
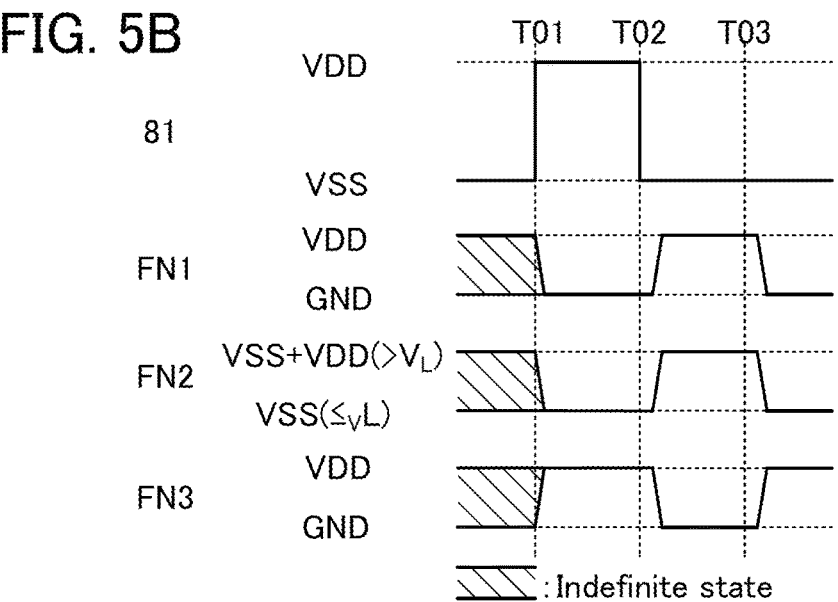
FIG. 5B is a diagram showing an operation example of the display apparatus.

FIG. 5(B) is a timing chart showing an example of an operation method of the switch circuit 16 having the configuration shown in FIG. 5(A). Here, the potential VDD can be a potential higher than or equal to the potential $V_H$, and a potential "VSS+VDD" is higher than the potential $V_L$. In addition, the source driver circuit 13 can output a potential higher than or equal to a potential GND which is the ground potential. Furthermore, the second data included in the digital image data is 1-bit data, and the source driver circuit 13 supplies the potential GND or the potential VDD to the switch circuit 16 depending on the value of the second data. In addition, the threshold voltage of the transistor 68a and the transistor 68b is 0 V, and the potential $V_M$ is a potential higher than or equal to the ground potential. Furthermore, the potential supplied to the gate of the transistor 68a is the potential VDD when the potential of the node FN1 is the potential GND, and the potential GND when the potential of the node FN1 is the potential VDD.

From Time T01 to Time T02, the potential of the node FN1 and the potential of the node FN2 are reset. At Time T01, the source driver circuit 13 outputs the potential GND to the switch circuit 16 and writes the potential GND to the node FN1. In addition, the potential of the wiring 81 is set to the potential VDD at Time T01, whereby the transistor 71 is brought into conduction and the potential VSS is written to the node FN2. Furthermore, the potential of the node FN3 becomes the potential VDD. Note that the operation from Time T1 to Time T02 can be performed in a retrace period of the operation of the display apparatus 10, for example.

Time T02 to Time T03 show the case where the source driver circuit 13 supplies the potential VDD to the switch circuit 16 as the potential corresponding to the second data. When the potential of the wiring 81 is set to the potential VSS at Time T02 and then the potential VDD is supplied from the source driver circuit 13 to the switch circuit 16, the potential of the node FN1 becomes the potential VDD. As a result, when the capacitive coupling coefficient of the node FN2 is one, the potential of the node FN2 becomes the potential "VSS+VDD," which is higher than the potential $V_L$. The potential of the node FN3 becomes the potential GND. Since the threshold voltages of the transistor 68a and the transistor 68b are 0 V as described above, the transistor 68a is brought into non-conduction and the transistor 68b is brought into conduction. In this manner, the value of the potential $V_{S2}$ becomes the potential $V_L$.

The Time T03 and thereafter show the case where the source driver circuit 13 supplies the potential GND to the switch circuit 16 as a potential corresponding to the second data. When the potential of the wiring 81 is set to the potential VSS at Time T03 and then the potential GND is supplied from the source driver circuit 13 to the switch circuit 16, the potential of the node FN1 becomes the potential GND. As a result, when the capacitive coupling coefficient of the node FN2 is one, the potential of the node FN2 becomes higher than the potential VSS, which is lower than or equal to the potential $V_L$. The potential of the node FN3 becomes the potential VDD. Since the threshold voltages of the transistor 68a and the transistor 68b are 0 V as described above, the transistor 68a is brought into conduction and the transistor 68b is brought into non-conduction. In this manner, the value of the potential $V_{S2}$ becomes the potential $V_M$.

A transistor with an extremely low off-state current is preferably used as the transistor 71. This enables long-term retention of the potential of the node FN2. An example of the transistor with an extremely low off-state current is an OS transistor.

As a semiconductor material used for an OS transistor, a metal oxide whose energy gap is greater than or equal to 2 eV, preferably greater than or equal to 2.5 eV, further preferably greater than or equal to 3 eV can be used. A typical example is an oxide semiconductor containing indium, and a CAAC (C-Axis Aligned Crystalline)-OS or a CAC (Cloud-Aligned Composite)-OS described later can be used, for example. The CAAC-OS is an oxide semiconductor with crystallinity. A transistor using the oxide semiconductor with crystallinity can have improved reliability and thus is favorably used for the display device of one embodiment of the present invention. A CAC-OS exhibits excellent mobility characteristics and thus is suitable for a transistor that operates at high speed, for example.

An OS transistor has a large energy gap and thus exhibits an extremely low off-state current characteristics. An OS transistor has features that impact ionization, an avalanche breakdown, a short-channel effect, and the like do not occur, for example, which are different from those of a Si transistor, leading to formation of a highly reliable circuit.

Furthermore, an OS transistor is characterized by high withstand voltage as described above. Therefore, when an OS transistor is used as the transistor 71, a high voltage can be applied to the source, drain, and gate of the transistor 71. Thus, the potential VSS can be a lower negative potential, i.e., a potential with a larger absolute value, for example.

Alternatively, a Si transistor may be used as the transistor 71. Since a Si transistor has a high on-state current as described above, the potential of the node FN2 can be reset in a short time.

1-4. Configuration Example 4 of Display Apparatus

Figure 6:
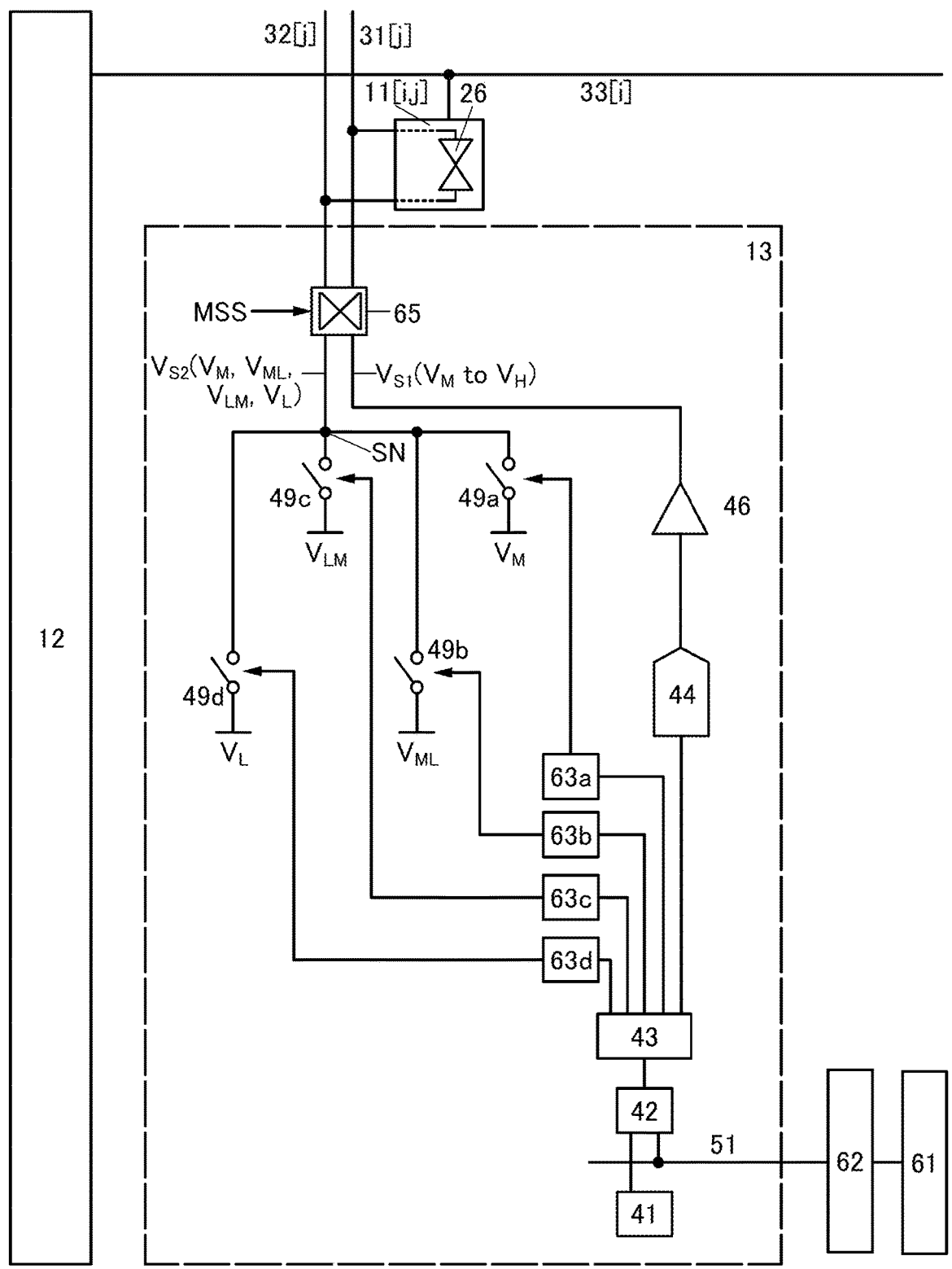
FIG. 6 is a diagram showing an example of a display apparatus.

FIG. 2(A) and the like show the configuration examples of the source driver circuit 13 and the like in the case where the number of bits of the second data included in the digital image data input to the source driver circuit 13 is 1 bit; however, the number of bits of the second data may be two or more bits. FIG. 6 shows a configuration example of the source driver circuit 13 in the case where the number of bits of the second data is two bits, and is a modification example of FIG. 2(A).

The source driver circuit 13 includes a switch 49a, a switch 49b, a switch 49c, a switch 49d, a level shift circuit 63a, a level shift circuit 63b, a level shift circuit 63c, and a level shift circuit 63d in addition to the shift register 41, the latch circuit 42, the level shift circuit 43, the DA converter circuit 44, the amplifier circuit 46, and the selection circuit 65. As the switch 49a to the switch 49d, a CMOS transistor, an n-channel transistor, or a p-channel transistor can be used, for example.

Note that the switch 49a to the switch 49d, the level shift circuit 63a to the level shift circuit 63d, and the selection circuit 65 may be provided in a circuit different from the source driver circuit 13.

Output terminals of the level shift circuit 43 are electrically connected to input terminals of the level shift circuit 63a to the level shift circuit 63d in addition to the input terminal of the DA converter circuit 44. The first input terminal of the selection circuit 65 is electrically connected to the output terminal of the amplifier circuit 46 as in the case shown in FIG. 2(A). The second input terminal of the selection circuit 65 is electrically connected to one terminal of the switch 49a, one terminal of the switch 49b, one terminal of the switch 49c, and one terminal of the switch 49d. Here, a connection portion of wirings where the second input terminal of the selection circuit 65, one terminal of the switch 49a, one terminal of the switch 49b, one terminal of the switch 49c, and one terminal of the switch 49d are connected is the node SN.

The on/off of the switch 49a can be controlled by a signal output from the level shift circuit 63a. The on/off of the switch 49b can be controlled by a signal output from the level shift circuit 63b. The on/off of the switch 49c can be controlled by a signal output from the level shift circuit 63c. The on/off of the switch 49d can be controlled by a signal output from the level shift circuit 63d.

The level shift circuit 63a to the level shift circuit 63d have a function of outputting a signal obtained by conversion of the amplitude voltage of the second data into a high level voltage or a low level voltage. Specifically, the level shift circuit 63a to the level shift circuit 63d have a function of converting the amplitude voltage of the second data included in the digital image data supplied from the level shift circuit 43 into an amplitude voltage at which the switch 49a to the switch 49d operate properly. For example, the level shift circuit 63a to the level shift circuit 63d have a function of converting the amplitude voltage of the second data such that only the switch 49a of the switch 49a to the switch 49d is turned on when the value of the second data is "00" in binary notation, only the switch 49b is turned on when the value is "01," only the switch 49c is turned on when the value is "10," and only the switch 49d is turned on when the value is "11."

For example, the potential $V_M$ can be applied to the other terminal of the switch 49a. For example, a potential $V_{ML}$ can be applied to the other terminal of the switch 49b. For example, a potential $V_{LM}$ can be applied to the other terminal of the switch 49c. For example, the potential $V_L$ can be applied to the other terminal of the switch 49d. In this case, the potential $V_{S2}$ can be the potential $V_M$, the potential $V_{ML}$, the potential $V_{LM}$, or the potential $V_L$. Note that the potentials can be the potential $V_M$, the potential $V_{ML}$, the potential $V_{LM}$, and the potential $V_L$ in descending order of level. Here, a difference between the potential $_{VM}$ and the potential $V_{ML}$, a difference between the potential $V_{ML}$ and the potential $V_{LM}$, and a difference between the potential $V_{LM}$ and the potential $V_L$ are preferably equal to a difference between the potential $V_H$ and the potential $V_M$.

FIGS. 7A1 and 7A2 are diagrams showing a relationship of the potential $V_{S1}$ and the potential $V_{S2}$ to the digital value of the digital image data input to the source driver circuit 13. In FIG. 7A1, the source driver circuit 13 has the configuration shown in FIG. 6. The potential $V_{S2}$ is set to the potential $V_M$ when the value of the second data is "00" in binary notation, the potential $V_{S2}$ is set to the potential $V_{ML}$ when the value is "01," the potential $V_{S2}$ is set to the potential $V_{LM}$ when the value is "10," and the potential $V_{S2}$ is set to the potential $V_L$ when the value is "11." By contrast, in FIG. 7A2, the potential $V_{S2}$ is the potential $V_M$ regardless of the value of the second data.

As shown in FIG. 7A1, with increasing the number of bits of the second data, the difference between the potential $V_{S1}$ and the potential $V_{S2}$ can be increased to the maximum value, the potential "$V_H$–$V_L$," even when the difference between the potential $V_H$ and the potential $V_M$ which are the maximum value and the minimum value, respectively, of the possible potentials of the potential $V_{S1}$. Thus, the voltage applied to the display device 26 can be increased even when the potential $V_H$ is low. Accordingly, even in the case where a high voltage is applied to the display device 26, the power consumption of the display apparatus 10 can below. Moreover, the display apparatus 10 can be downsized and inexpensive because the amplifier circuit 46 is not necessarily a high-voltage one.

FIG. 7(B) is a diagram showing a relationship of a difference between the potential of the wiring 31 and the potential of the wiring 32 to the digital value of the digital image data input to the source driver circuit 13 in the first mode and the second mode. As shown in FIG. 3(B), the difference between the potential of the wiring 31 and the potential of the wiring 32 is a potential "$V_{S1}$–$V_{S2}$" in the first mode and a potential "–($V_{S1}$–$V_{S2}$)" in the second mode. Thus, when the first mode and the second mode are switched, the voltage applied to the display device 26 is inverted and frame inversion driving or the like can be performed.

1-5. Configuration Example 1 of Pixel

Figure 8:
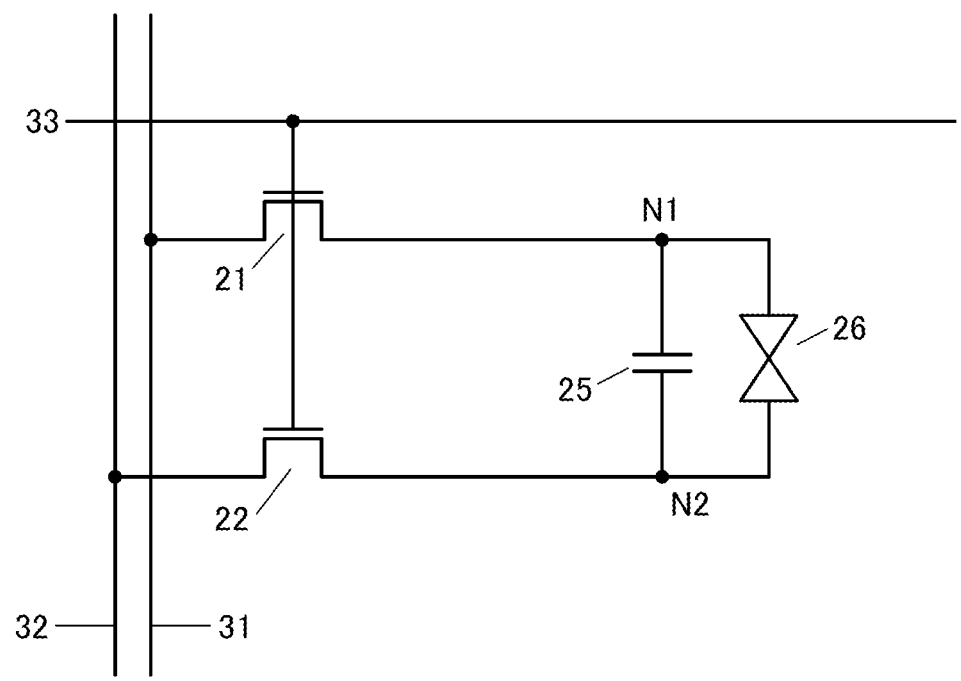
FIG. 8 is a diagram showing an example of a pixel.

A configuration example of the pixel 11 is described below. FIG. 8 is a diagram showing a pixel 11a which can be used as the pixel 11. The pixel 11a includes a transistor 21, a transistor 22, a capacitor 25, and a display device 26. Here, as the transistor 21 and the transistor 22, a CMOS transistor, an n-channel transistor, or a p-channel transistor can be used, for example. The case where n-channel transistors are used as the transistor 21 and the transistor 22 is described below; however, the following description can be referred to even for the case where the other transistors are used.

One of a source and a drain of the transistor 21 is electrically connected to one electrode of the capacitor 25. The one electrode of the capacitor 25 is electrically connected to one electrode of the display device 26. One of a source and a drain of the transistor 22 is electrically connected to the other electrode of the capacitor 25. The other electrode of the capacitor 25 is electrically connected to the other electrode of the display device 26.

Here, a wiring to which the one of the source and the drain of the transistor 21, one electrode of the capacitor 25, and one electrode of the display device 26 are connected is a node N1. A wiring to which one of the source and the drain of the transistor 22, the other electrode of the capacitor 25, and the other electrode of the display device 26 are connected is a node N2.

The other of the source and the drain of the transistor 21 is electrically connected to the wiring 31. The other of the source and the drain of the transistor 22 is electrically connected to the wiring 32. A gate of the transistor 21 and a gate of the transistor 22 are electrically connected to the wiring 33.

The transistor 21 has a function of controlling supply of the potential of the wiring 31 to the pixel 11a. The transistor 22 has a function of controlling supply of the potential of the wiring 32 to the pixel 11a.

The potential of the wiring 31 is retained at the node N1. The potential of the wiring 32 is retained at the node N2. Accordingly, the use of transistors with an extremely low off-state current as the transistor 21 and the transistor 22 enables long-term retention of the potentials of the node N1 and the node N2. As the transistors, OS transistors can be used, for example.

Note that Si transistors may be used as the transistor 21 and the transistor 22. Alternatively, an OS transistor may be used as one of the transistor 21 and the transistor 22, and a Si transistor may be used as the other.

Figure 9:
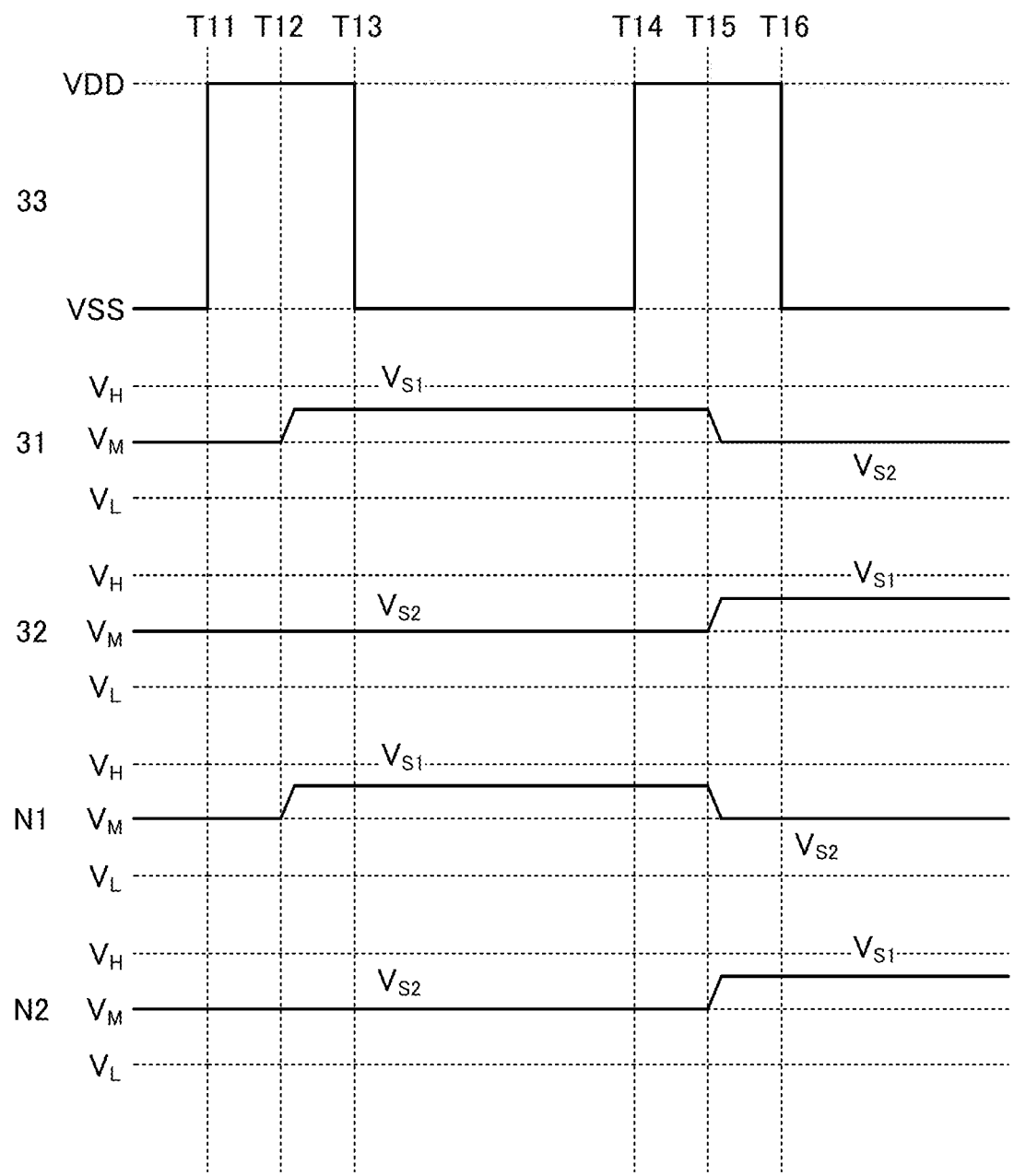
FIG. 9 is a diagram showing an operation example of a pixel.

Next, an example of an operation method of the pixel 11a is described with reference to a timing chart shown in FIG. 9. Here, Time T11 to Time T13 and Time T14 to Time T16 can each be one frame period. Note that although the potential of the wiring 33 is set to the potential VDD so that the transistor 21 and the transistor 22 are brought into conduction, the potential of the wiring 33 is not necessarily set to the potential VDD as long as the transistor 21 and the transistor 22 can be brought into conduction. In addition, although the potential of the wiring 33 is set to the potential VSS so that the transistor 21 and the transistor 22 are brought into non-conduction, the potential of the wiring 33 is not necessarily set to the potential VSS as long as the transistor 21 and the transistor 22 can be brought into non-conduction.

At Time T11, the potential of the wiring 33 is set to the potential VDD, so that the transistor 21 and the transistor 22 are brought into conduction. Then, at Time T12, the potential of the wiring 31 is set to the potential $V_{S1}$ and the potential of the wiring 32 is set to the potential $V_{S2}$, so that the potential $V_{S1}$ is written to the node N1 and the potential $V_{S2}$ is written to the node N2. Thus, the display device 26 performs display in accordance with the potential $V_{S1}$ and the potential $V_{S2}$. Note that the potential $V_{S2}$ is the potential $V_M$ in FIG. 9.

When the potential of the wiring 33 is set to the potential VSS at Time T13, the transistor 21 and the transistor 22 are brought into non-conduction, the potential $V_{S1}$ is retained at the node N1, and the potential $V_{S2}$ is retained at the node N2. From the above, it can be said that the display apparatus 10 operates in the first mode from Time T12 to Time T13.

At Time T14, the potential of the wiring 33 is set to the potential VDD, so that the transistor 21 and the transistor 22 are brought into conduction. Then, at Time T15, the potential of the wiring 31 is set to the potential $V_{S2}$ and the potential of the wiring 32 is set to the potential $V_{S1}$, so that the voltage applied to the display device 26 is inverted. In this manner, frame inversion driving or the like is performed.

When the potential of the wiring 33 is set to the potential VSS at Time T16, the transistor 21 and the transistor 22 are brought into non-conduction, the potential $V_{S2}$ is retained at the node N1, and the potential $V_{S1}$ is retained at the node N2. From the above, it can be said that the display apparatus 10 operates in the second mode from Time T15 to Time T16. The above is an example of the operation method of the pixel 11a.

1-6. Configuration Example 2 of Pixel

Figure 10:
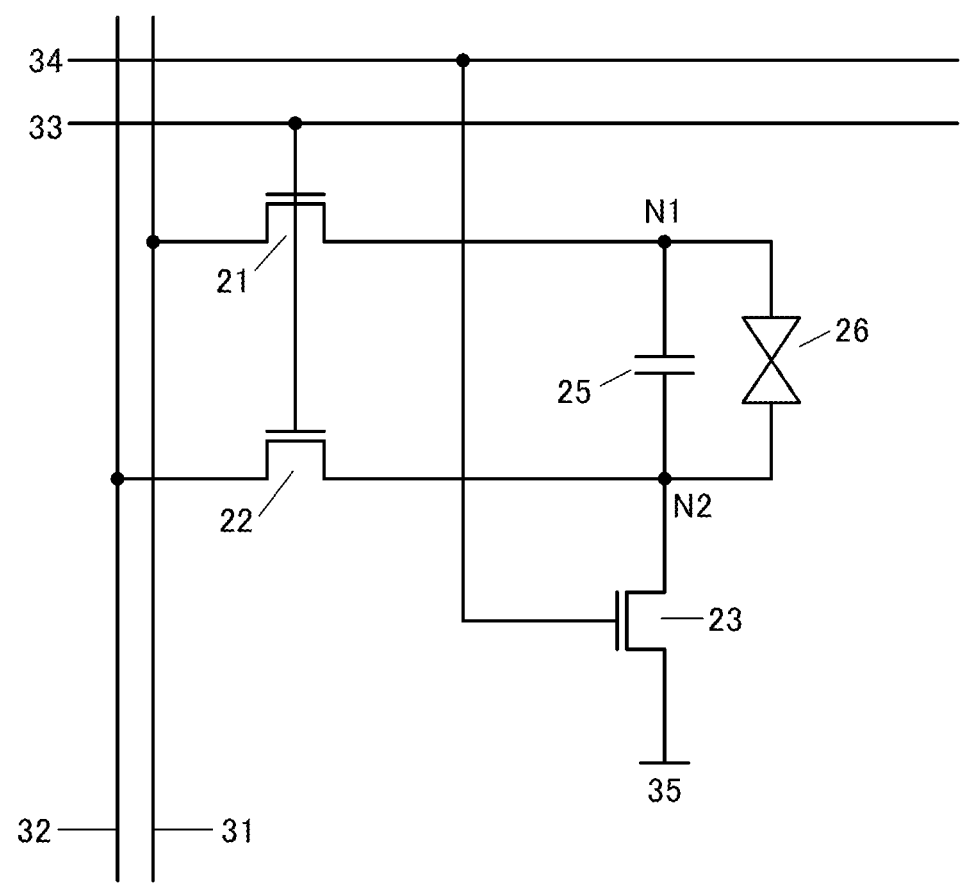
FIG. 10 is a diagram showing an example of a pixel.

FIG. 10 is a diagram showing a pixel 11b which can be used as the pixel 11. The pixel 11b is a modification example of the pixel 11a and is different from the pixel 11a in that a transistor 23 is provided. Here, as the transistor 23, a CMOS transistor, an n-channel transistor, or a p-channel transistor can be used, for example. The case where an n-channel transistor is used as the transistor 23 is described below; however, the following description can be referred to even for the case where the other transistor is used.

One of a source and a drain of the transistor 23 is electrically connected to the node N2. The other of the source and the drain of the transistor 23 is electrically connected to a wiring 35. A gate of the transistor 23 is electrically connected to a wiring 34.

The wiring 35 has a function of a common wiring. In other words, a configuration can be employed in which, for example, the others of the sources and the drains of all the transistors 23 provided in the pixels 11b included in the display apparatus 10 are electrically connected to one another through one wiring 35. A constant potential is supplied to the wiring 35, and for example, the ground potential or the potential $V_M$ can be supplied. Moreover, the wiring 34 has a function of a scan line controlling the transistors 23.

As in the pixel 11a, the potential of the wiring 32 is retained at the node N2. Accordingly, like the transistor 22, a transistor with an extremely low off-state current, e.g., an OS transistor, can be used as the transistor 23. Note that a Si transistor may be used as the transistor 23.

Next, an example of an operation method of the pixel 11b is described with reference to a timing chart shown in FIG. 11. Here, a potential supplied to the wiring 35 is the potential $V_M$. In addition, each of Time T21 to Time T25 and Time T26 to Time T30 can be one frame period. Note that although the potential of the wiring 34 is set to the potential VDD so that the transistor 23 is brought into conduction, the potential of the wiring 34 is not necessarily the potential VDD as long as the transistor 23 can be brought into conduction. In addition, although the potential of the wiring 34 is set to the potential VSS so that the transistor 23 is brought into non-conduction, the potential of the wiring 34 is not necessarily the potential VSS as long as the transistor 23 can be brought into non-conduction.

The potential of the wiring 34 is set to the potential VSS at Time T21, and the potential of the wiring 33 is set to the potential VDD at Time T22. Furthermore, the potential of the wiring 31 is set to the potential $V_{S1}$ and the potential of the wiring 32 is set to the potential $V_{S2}$ at Time T23. Consequently, the transistor 21 and the transistor 22 are brought into conduction, the potential $V_{S1}$ is written to the node N1, so that the potential $V_{S2}$ is written to the node N2. Thus, the display device 26 performs display in accordance with the potential $V_{S1}$ and the potential $V_{S2}$. Note that the potential $V_{S2}$ is the potential $V_L$ in FIG. 11.

When the potential of the wiring 33 is set to the potential VSS at Time T24, the transistor 21 and the transistor 22 are brought into non-conduction, the potential $V_{S1}$ is retained at the node N1, and the potential $V_{S2}$ is retained at the node N2. From the above, it can be said that the display apparatus 10 operates in the first mode from Time T23 to Time T24.

When the potential of the wiring 34 is set to the potential VDD at Time T25, the transistor 23 is brought into conduction and the potential of the node N2 becomes the potential $V_M$. That is, the potential of the node N2 is increased by "$V_M - V_{S2}$." Therefore, the potential of the node N1 is also increased by "$V_M - V_{S2}$" to become a potential "$V_{S1} + V_M - V_{S2}$," when the capacitive coupling coefficient of the node N1 is one. Consequently, the voltage applied to the display device 26 is not changed. Here, the potential "$V_{S1} + V_M - V_{S2}$" may be a potential higher than the potential $V_H$. Note that the capacitive coupling coefficient of the node N1 is one also in the following description.

The potential of the wiring 34 is set to the potential VSS at Time T26, and the potential of the wiring 33 is set to the potential VDD at Time T27. At Time T28, the potential of the wiring 31 is set to the potential $V_{S2}$, and the potential of the wiring 32 is set to the potential $V_{S1}$. Thus, the transistor 21 and the transistor 22 are brought into conduction, and the polarity of the voltage applied to the display device 26 is inverted. In this manner, frame inversion driving or the like is performed.

When the potential of the wiring 33 is set to the potential VSS at Time T29, the transistor 21 and the transistor 22 are brought into non-conduction, the potential $V_{S2}$ is retained at the node N1, and the potential $V_{S1}$ is retained at the node N2. From the above, it can be said that the display apparatus 10 operates in the second mode from Time T28 to Time T29.

When the potential of the wiring 34 is set to the potential VDD at Time T30, the transistor 23 is brought into conduction and the potential of the node N2 becomes the potential $V_M$. That is, the potential of the node N2 is increased by "$V_M - V_{S1}$," that is, decreased by "$V_{S1} - V_M$." Therefore, the potential of the node N1 is also increased by "$V_M - V_{S1}$," that is, decreased by "$V_{S1} - V_M$" to become a potential "$V_{S2} + V_M - V_{S1}$." Consequently, the voltage applied to the display device 26 is not changed. Here, the potential "$V_{S2} + V_M - V_{S1}$" may be a potential lower than the potential $V_L$. The above is an example of the operation method of the pixel 11b.

Figure 11:
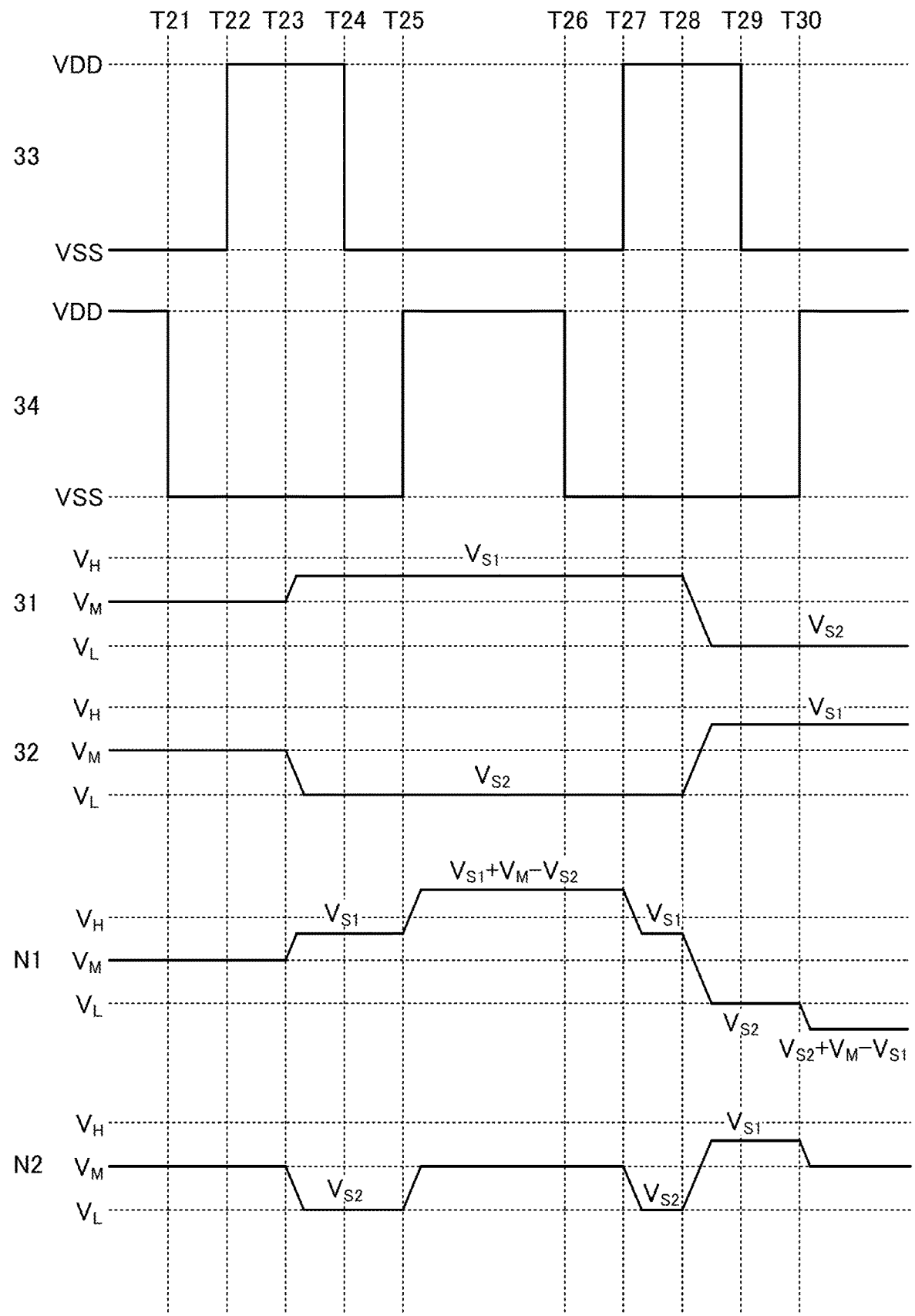
FIG. 11 is a diagram showing an operation example of a pixel.

As shown in FIG. 11, the potential of the node N2 is set to the potential $V_M$ after one of the potential $V_{S1}$ and the potential $V_{S2}$ is written to the node N1 and the other of the potential $V_{S1}$ and the potential $V_{S2}$ is written to the node N2. Thus, the potential of the node N2 can be set to the potential $V_M$ without changing the voltage applied to the display device 26 before and after setting the potential of the node N2 to the potential $V_M$. Accordingly, fluctuations in voltage applied to the display device 26 due to electrical noise or the like generated from the wiring 31 to the wiring 34, for example, can be inhibited. This can improve the display quality of an image displayed on the display apparatus 10.

1-7. Configuration Example 3 of Pixel

Figure 12A:
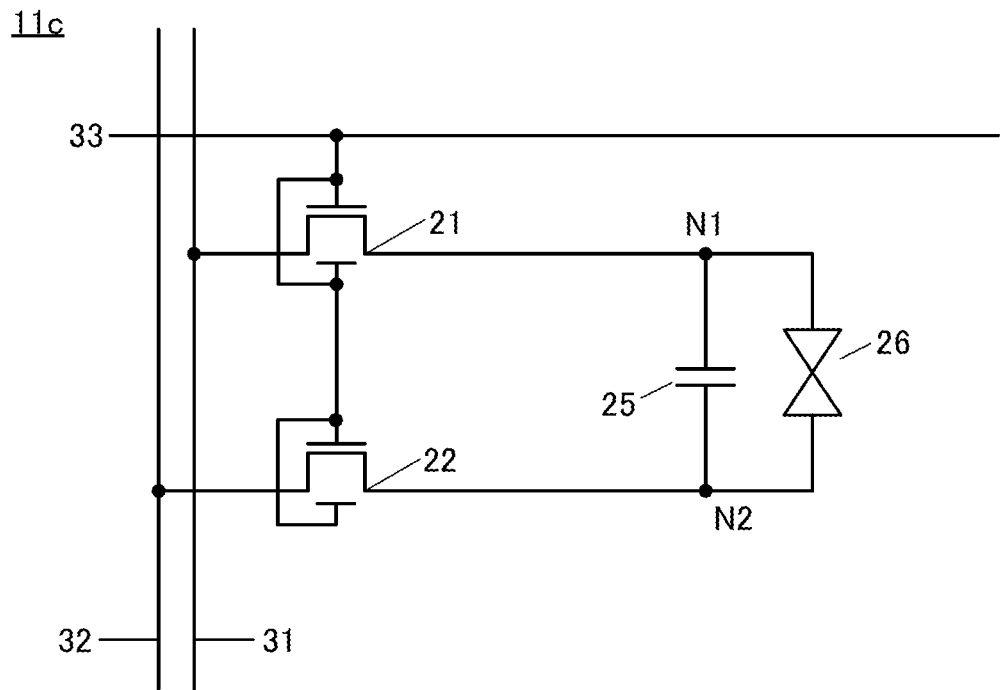
FIGS. 12A and 12B are diagrams showing examples of a pixel.
Figure 12B:
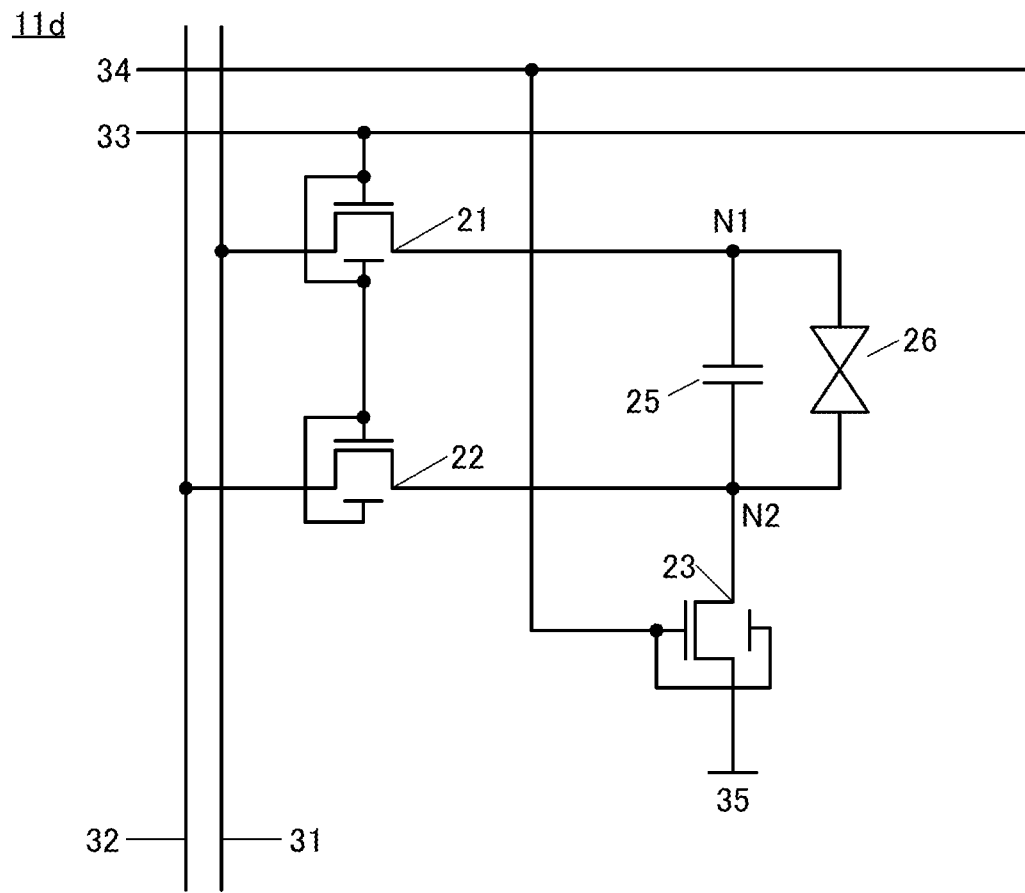

FIG. 12(A) is a diagram showing a pixel 11c which can be used as the pixel 11, and FIG. 12(B) is a diagram showing a pixel 11*d* which can be used as the pixel 11. The pixel 11*c* has a configuration in which the transistor 21 and the transistor 22 provided in the pixel 11*a* are provided with back gates. The pixel 11*d* has a configuration in which the transistor 21 to the transistor 23 provided in the pixel 11*b* are provided with back gates. The back gate can be electrically connected to a front gate of the transistor provided with the back gate, and an effect of increasing the on-state current is obtained. A structure in which different potentials can be supplied to the back gate and the front gate may be employed. In such a structure, the threshold voltage of the transistor can be controlled. Note that although all of the transistors are provided with back gates in each of FIGS. 12(A) and 12(B), a transistor without a back gate may be included.

1-8. Configuration Example 4 of Pixel

Figure 13A:
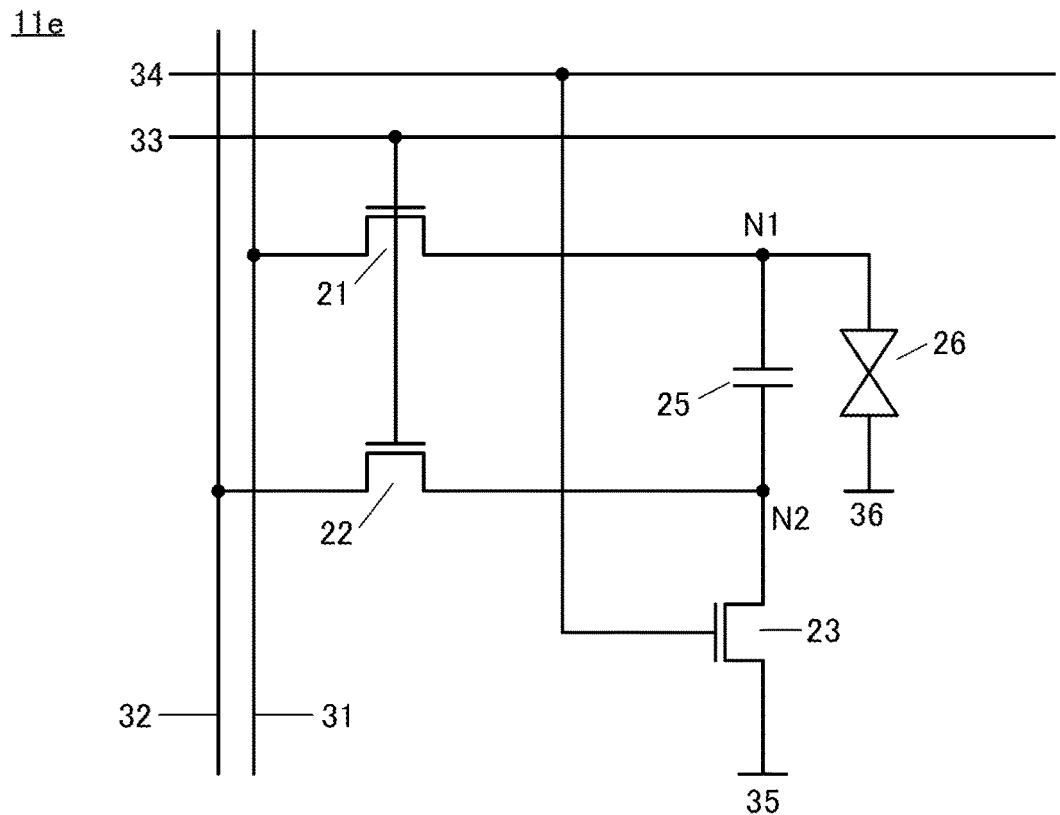
FIGS. 13A and 13B are diagrams showing examples of a pixel.

FIG. 13(A) is a diagram showing a pixel 11*e* which can be used as the pixel 11. The pixel 11*e* has a configuration in which the other electrode of the display device 26 provided in the pixel 11*b* is not connected to the node N2. In the pixel 11*e*, the other electrode of the display device 26 can be electrically connected to a wiring 36 having a function of a common wiring. Here, a constant potential is supplied to the wiring 36. For example, the same potential as the potential supplied to the wiring 35 can be supplied to the wiring 36. For example, the ground potential or the potential $V_M$ can be supplied to the wiring 36. Note that the pixel 11*e* can operate in a method similar to the method shown in FIG. 11.

Figure 13B:
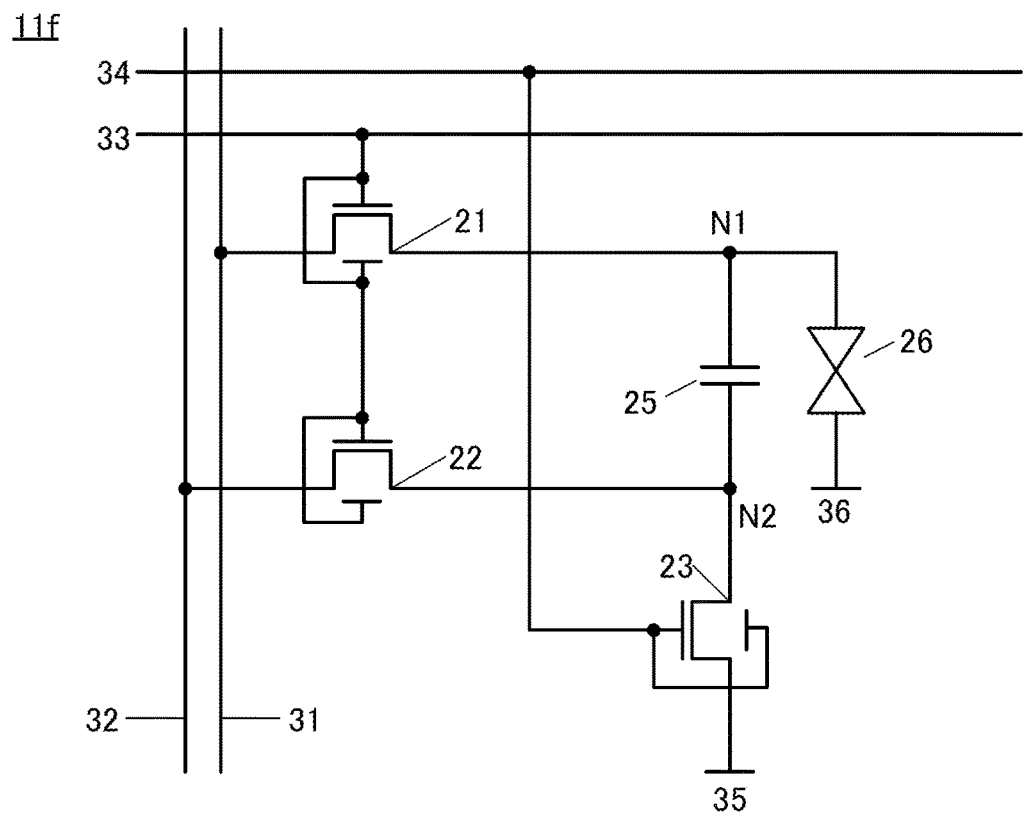

FIG. 13(B) is a diagram showing a pixel 11*f* which can be used as the pixel 11. The pixel 11*f* has a structure in which the transistor 21 to the transistor 23 provided in the pixel 11*e* are provided with back gates. Note that although all of the transistors are provided with back gates in each of FIG. 13(B), a transistor without a back gate may be included.

1-9. Configuration Example 5 of Display Apparatus

Figure 14:
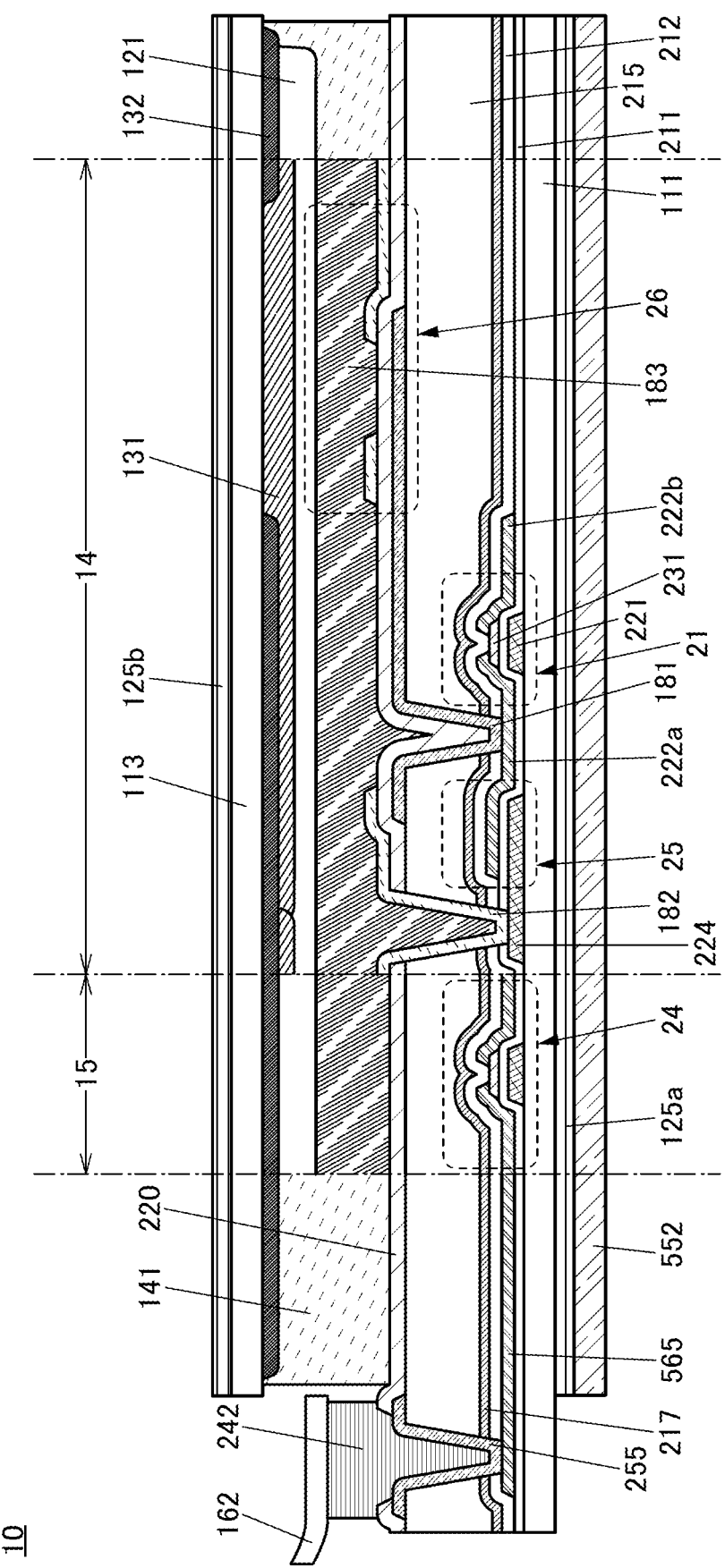
FIG. 14 is a diagram showing an example of a display apparatus.

FIG. 14 is a cross-sectional view illustrating a structure example of the display apparatus 10 and shows the case where the display apparatus 10 is a transmissive liquid crystal display apparatus employing a horizontal electric field mode.

FIG. 14 shows structure examples of the pixel array 14 and a circuit 15. The circuit 15 can be used as the gate driver circuit 12, the source driver circuit 13, or the like.

The display apparatus 10 has a structure in which a substrate 111 and a substrate 113 are attached to each other. In the pixel array 14, the transistor 21, the capacitor 25, the display device 26, and the like are provided over the substrate 111. In the circuit 15, a transistor 24 and the like are provided over the substrate 111. Moreover, a coloring layer 131, a light-blocking layer 132, and the like are provided on the substrate 113.

The transistor 21 includes a conductive layer 221 functioning as a gate electrode, an insulating layer 211 functioning as a gate insulating layer, a semiconductor layer 231, and a conductive layer 222*a* and a conductive layer 222*b* functioning as a source electrode and a drain electrode. The capacitor 25 includes a conductive layer 224 and the conductive layer 222*a* functioning as an electrode and the insulating layer 211 functioning as a dielectric layer. The transistor 21, the transistor 24, and the capacitor 25 are covered by an insulating layer 212 and an insulating layer 217. An insulating layer 215 functioning as an interlayer insulating layer is provided between the transistor 21, the transistor 24, and the capacitor 25 and the display device 26.

The semiconductor layer 231 can contain a metal oxide. In this case, the transistor 21 is an OS transistor. Note that the other transistors provided over the substrate 111, such as the transistor 24, can also have a structure similar to that of the transistor 21.

The display device 26 is a liquid crystal device employing a horizontal electric field mode, specifically, an FFS (Fringe Field Switching) mode. The display device 26 includes an electrode 181, an electrode 182, and a liquid crystal layer 183. The alignment of the liquid crystal layer 183 can be controlled with the electrical field generated between the electrode 181 and the electrode 182. The liquid crystal layer 183 is positioned over an insulating layer 220 and the electrode 182. The electrode 181 is electrically connected to the conductive layer 222*a* through an opening provided in the insulating layer 215, the insulating layer 217, and the insulating layer 212. The electrode 182 is electrically connected to the conductive layer 224 through an opening provided in the insulating layer 215, the insulating layer 217, the insulating layer 212, and the insulating layer 211. Note that the electrode 182 may have a top-surface shape (also referred to as a planar shape) that has a comb-like shape or a top-surface shape that is provided with a slit. One or more openings can be provided in the electrode 182.

The insulating layer 220 is provided between the electrode 181 and the electrode 182. The electrode 181 includes a portion that overlaps with the electrode 182 with the insulating layer 220 therebetween. Furthermore, a portion that is not provided with the electrode 182 over the electrode 181 is included in a region where the electrode 181 and the coloring layer 131 overlap with each other.

Light from a backlight unit 552 is emitted to the outside of the display apparatus through the substrate 111, the electrode 181, the electrode 182, the liquid crystal layer 183, the coloring layer 131, and the substrate 113. As materials of these layers that transmit light from the backlight unit 552, visible-light-transmitting materials are used.

Here, a backlight unit with which light of the colors, such as red, green, and blue, are sequentially supplied by a field sequential mode is used as the backlight unit 552, whereby the display apparatus 10 can perform color display without formation of the coloring layer 131. Note that when light of all colors is supplied at the same time, white display can be performed.

An overcoat 121 is preferably provided between the liquid crystal layer 183 and each of the coloring layer 131 and the light-blocking layer 132. The overcoat 121 can inhibit the diffusion of impurities contained in the coloring layer 131, the light-blocking layer 132, and the like to the liquid crystal layer 183.

The substrate 111 and the substrate 113 are attached to each other with a bonding layer 141. The liquid crystal layer 183 is encapsulated in a region that is surrounded by the substrate 111, the substrate 113, and the bonding layer 141.

A polarizing plate 125*a* and a polarizing plate 125*b* are provided with the pixel array 14, the circuit 15, and the like of the display apparatus positioned therebetween. Light from the backlight unit 552 provided outside the polarizing plate 125*a* enters the display apparatus 10 through the polarizing plate 125*a*. In this case, the optical modulation of light can be controlled by controlling the alignment of the liquid crystal layer 183 with a voltage supplied between the electrode 181 and the electrode 182. In other words, the intensity of light emitted from the display apparatus 10 through the polarizing plate 125*b* can be controlled. Furthermore, the coloring layer 131 absorbs light of wavelengths other than a specific wavelength range from light entering the display device 26, and thus light emitted from the display apparatus 10 is light that exhibits red, blue, or green colors, for example. Note that the polarizing plate 125a and the polarizing plate 125b are not necessarily provided.

A conductive layer 565 is electrically connected to an FPC 162 through a conductive layer 255 and a connector 242.

When a liquid crystal device employing a horizontal electric field mode is used as the display device 26, both of the electrode 181 which is one electrode of the display device 26 and the electrode 182 which is the other electrode of the display device 26 can be formed on one surface of the liquid crystal layer 183. Thus, both of the electrode 181 and the electrode 182 can be electrically connected to an electrode included in the capacitor 25.

As the liquid crystal used in the liquid crystal device, a liquid crystal exhibiting a blue phase can be used. In this case, a high voltage is preferably applied to the display device 26. Since a high voltage can be applied to the display device 26 in the display apparatus 10, the display apparatus 10 can be operated normally even when a liquid crystal exhibiting a blue phase is used in the display device 26.

A blue phase is one of the liquid crystal phases, which appears just before a cholesteric phase changes into an isotropic phase when the temperature of a cholesteric liquid crystal is increased. Since the blue phase appears only in a narrow temperature range, a liquid crystal composition in which a chiral material is mixed to account for several weight percent or more is used for the liquid crystal in order to improve the temperature range. The liquid crystal composition containing a liquid crystal exhibiting a blue phase and a chiral material has a short response time and optical isotropy. In addition, the liquid crystal composition containing a liquid crystal exhibiting a blue phase and a chiral material does not need alignment treatment and has small viewing angle dependence. In addition, an alignment film does not need to be provided and rubbing treatment is thus not necessary; accordingly, electrostatic discharge damage caused by the rubbing treatment can be prevented and defects and damage of the liquid crystal display apparatus in the manufacturing process can be reduced.

Note that a liquid crystal other than a liquid crystal exhibiting a blue phase may be used as a liquid crystal used for the liquid crystal device. For example, a thermotropic liquid crystal, a low-molecular liquid crystal, a high-molecular liquid crystal, a polymer dispersed liquid crystal, a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions. As the liquid crystal material, either a positive liquid crystal or a negative liquid crystal may be used. Note that in the case where a liquid crystal other than a blue phase is used as a liquid crystal used in a liquid crystal device, an alignment film is preferably provided in order to control the alignment of liquid crystals.

1-10. Configuration Example 6 of Display Apparatus

Figure 15:
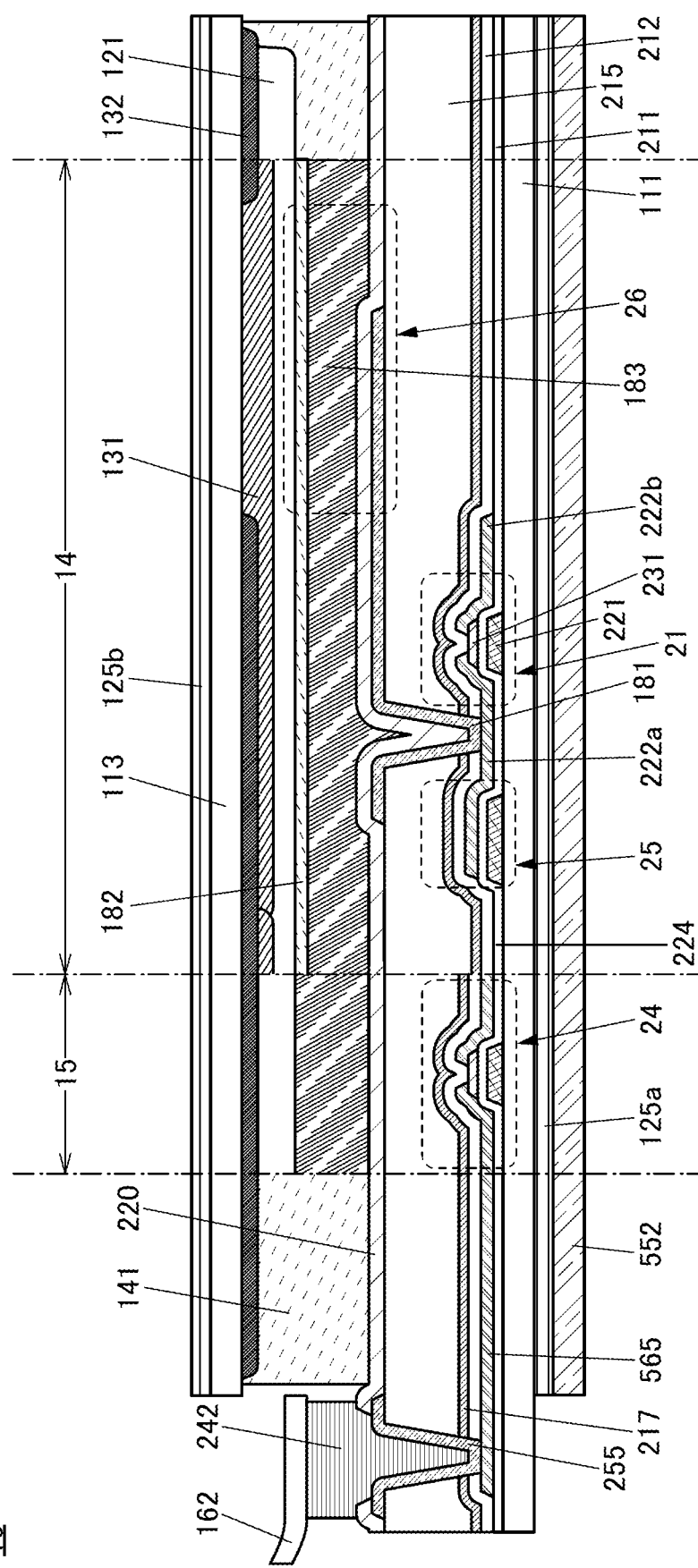
FIG. 15 is a diagram showing an example of a display apparatus.

FIG. 15 is a cross-sectional view illustrating a structure example of the display apparatus 10 and shows the case where the display apparatus 10 is a transmissive liquid crystal display apparatus employing a vertical electric field mode. In the case where the pixel 11 provided in the display apparatus is the pixel 11e or the pixel 11f, the electrode 182 included in the display device 26 is not necessarily electrically connected to an electrode included in the capacitor 25. Thus, the electrode 181 and the electrode 182 included in the display device 26 can be provided in positions facing each other with the liquid crystal layer 183 therebetween, whereby the display apparatus 10 can be a transmissive liquid crystal display apparatus employing a vertical electric field mode. In the case where the display apparatus 10 is a transmissive liquid crystal display device employing a vertical electric field mode, a liquid crystal device employing a TN (Twisted Nematic) mode, a VA (Vertical Alignment) mode, an MVA (Multidomain Vertical Alignment) mode, a PVA (Patterned Vertical Alignment) mode, an OCB (Optically Compensated Bend) mode, or the like can be used as the display device 26.

Like the case where the display apparatus 10 has the structure illustrated in FIG. 14, a backlight unit in which light of the colors are sequentially supplied by a field sequential mode may be used as the backlight unit 552.

This embodiment can be implemented in appropriate combination with any of the structures described in the other embodiments and the like.

Embodiment 2

In this embodiment, examples of a transistor that can be replaced with each transistor described in the above embodiment will be described with reference to drawings.

The display apparatus of one embodiment of the present invention can be manufactured using a transistor with various modes, such as a bottom-gate transistor or a top-gate transistor. Therefore, a material used for a semiconductor layer or a transistor structure can be easily changed depending on the existing manufacturing line.

[Bottom-Gate Transistor]

FIG. 16A1 is a cross-sectional view in the channel length direction of a channel protective transistor 810 that is a kind of bottom-gate transistor. In FIG. 16A1, the transistor 810 is formed over a substrate 771. In addition, the transistor 810 includes an electrode 746 over the substrate 771 with an insulating layer 772 therebetween. The transistor 810 further includes a semiconductor layer 742 over the electrode 746 with an insulating layer 726 therebetween. The electrode 746 can function as a gate electrode. The insulating layer 726 can function as a gate insulating layer.

The transistor 810 further includes an insulating layer 741 over a channel formation region in the semiconductor layer 742. The transistor 810 further includes an electrode 744a and an electrode 744b that are partly in contact with the semiconductor layer 742 and are over the insulating layer 726. The electrode 744a can function as one of a source electrode and a drain electrode. The electrode 744b can function as the other of the source electrode and the drain electrode. Part of the electrode 744a and part of the electrode 744b are formed over the insulating layer 741.

The insulating layer 741 can function as a channel protective layer. With the insulating layer 741 provided over the channel formation region, the semiconductor layer 742 can be prevented from being exposed at the time of forming the electrode 744a and the electrode 744b. Thus, the channel formation region in the semiconductor layer 742 can be prevented from being etched at the time of forming the electrode 744a and the electrode 744b. According to one embodiment of the present invention, a transistor with favorable electrical characteristics can be achieved.

Furthermore, the transistor 810 includes an insulating layer 728 over the electrode 744a, the electrode 744b, and the insulating layer 741 and includes an insulating layer 729 over the insulating layer 728.

In the case where an oxide semiconductor is used for the semiconductor layer 742, a material capable of removing oxygen from part of the semiconductor layer 742 to generate oxygen vacancies is preferably used at least for portions of the electrode 744a and the electrode 744b that are in contact with the semiconductor layer 742. The carrier concentration in regions of the semiconductor layer 742 where oxygen vacancies are generated is increased, so that the regions become n-type regions ($n^+$ layers). Accordingly, the regions can function as a source region and a drain region. When an oxide semiconductor is used for the semiconductor layer 742, examples of the material capable of removing oxygen from the semiconductor layer 742 to generate oxygen vacancies include tungsten and titanium.

Formation of the source region and the drain region in the semiconductor layer 742 makes it possible to reduce contact resistance between the semiconductor layer 742 and each of the electrode 744a and the electrode 744b. Accordingly, the electrical characteristics of the transistor, such as the field-effect mobility and the threshold voltage, can be improved.

In the case where a semiconductor such as silicon is used for the semiconductor layer 742, a layer that functions as an n-type semiconductor or a p-type semiconductor is preferably provided between the semiconductor layer 742 and the electrode 744a and between the semiconductor layer 742 and the electrode 744b. The layer that functions as an n-type semiconductor or a p-type semiconductor can function as a source region or a drain region of the transistor.

The insulating layer 729 is preferably formed using a material that has a function of preventing or reducing diffusion of impurities into the transistor from the outside. Note that the insulating layer 729 can be omitted as necessary.

A transistor 811 shown in FIG. 16A2 is different from the transistor 810 in that an electrode 723 that can function as a back gate electrode is provided over the insulating layer 729. The electrode 723 can be formed using a material and a method similar to those of the electrode 746.

In general, a back gate electrode is formed using a conductive layer and positioned so that a channel formation region of a semiconductor layer is sandwiched between a gate electrode and the back gate electrode. Thus, the back gate electrode can function in a manner similar to that of the gate electrode. The potential of the back gate electrode may be set equal to the potential of the gate electrode, or may be a ground potential (GND potential) or a given potential. Moreover, by changing the potential of the back gate electrode not in synchronization with but independently of that of the gate electrode, the threshold voltage of the transistor can be changed.

The electrode 746 and the electrode 723 can each function as a gate electrode. Thus, the insulating layer 726, the insulating layer 728, and the insulating layer 729 can each function as a gate insulating layer. Note that the electrode 723 may be provided between the insulating layer 728 and the insulating layer 729.

Note that in the case where one of the electrode 746 and the electrode 723 is referred to as a "gate electrode," the other is referred to as a "back gate electrode." For example, in the case where the electrode 723 in the transistor 811 is referred to as a "gate electrode," the electrode 746 is referred to as a "back gate electrode." In addition, in the case where the electrode 723 is used as a "gate electrode," the transistor 811 can be considered as a kind of top-gate transistor. Furthermore, in some cases, one of the electrode 746 and the electrode 723 is referred to as a "first gate electrode," and the other is referred to as a "second gate electrode."

By providing the electrode 746 and the electrode 723 with the semiconductor layer 742 therebetween and setting the potential of the electrode 746 equal to the potential of the electrode 723, a region of the semiconductor layer 742 through which carriers flow is enlarged in the film thickness direction; thus, the number of transferred carriers is increased. As a result, the on-state current of the transistor 811 is increased and the field-effect mobility is increased.

Therefore, the transistor 811 is a transistor having high on-state current for its occupation area. That is, the occupation area of the transistor 811 can be small for required on-state current. According to one embodiment of the present invention, the occupation area of a transistor can be reduced. Therefore, according to one embodiment of the present invention, a display device having a high degree of integration can be achieved.

In addition, the gate electrode and the back gate electrode are formed using conductive layers and thus each have a function of preventing an electric field generated outside the transistor from influencing a semiconductor layer in which a channel is formed (in particular, an electric field blocking function against static electricity or the like). Note that when the back gate electrode is provided to include a region overlapping with the semiconductor layer, the electric field blocking function can be enhanced.

Furthermore, when the back gate electrode is formed using a light-blocking conductive film, light can be prevented from entering the semiconductor layer from the back gate electrode side. Therefore, photodegradation of the semiconductor layer can be prevented and deterioration in electrical characteristics of the transistor, such as a shift of the threshold voltage, can be prevented.

According to one embodiment of the present invention, a transistor with high reliability can be achieved. Moreover, a semiconductor device with high reliability can be achieved.

FIG. 16B1 is a cross-sectional view in the channel length direction of a channel-protective transistor 820, which has a structure different from the structure in FIG. 16A1. The transistor 820 has substantially the same structure as the transistor 810 but is different from the transistor 810 in that the insulating layer 741 covers end portions of the semiconductor layer 742. In addition, the semiconductor layer 742 is electrically connected to the electrode 744a in an opening portion formed by removing part of the insulating layer 741 including a region that overlaps with the semiconductor layer 742. Furthermore, the semiconductor layer 742 is electrically connected to the electrode 744b in another opening portion formed by removing part of the insulating layer 741 which overlaps with the semiconductor layer 742. A region of the insulating layer 741 which overlaps with the channel formation region can function as a channel protective layer.

A transistor 821 shown in FIG. 16B2 is different from the transistor 820 in that the electrode 723 that can function as a back gate electrode is provided over the insulating layer 729.

By providing the insulating layer 741, the semiconductor layer 742 can be prevented from being exposed at the time of forming the electrode 744a and the electrode 744b. Thus, the semiconductor layer 742 can be prevented from being thinned down at the time of forming the electrode 744a and the electrode 744b.

In addition, the distance between the electrode 744a and the electrode 746 and the distance between the electrode 744b and the electrode 746 in the transistor 820 and the transistor 821 are larger than those in the transistor 810 and the transistor 811. Thus, parasitic capacitance generated between the electrode 744a and the electrode 746 can be reduced. Moreover, parasitic capacitance generated between the electrode 744b and the electrode 746 can be reduced. According to one embodiment of the present invention, a transistor with favorable electrical characteristics can be achieved.

A transistor 825 illustrate in FIG. 16C1 is a cross-sectional view in the channel length direction of a channel-etched transistor 825, which is a kind of bottom-gate transistor. In the transistor 825, the electrode 744a and the electrode 744b are formed without providing the insulating layer 741. Thus, part of the semiconductor layer 742 that is exposed at the time of forming the electrode 744a and the electrode 744b is etched in some cases. Meanwhile, since the insulating layer 741 is not provided, the productivity of the transistor can be increased.

A transistor 826 shown in FIG. 16C2 is different from the transistor 825 in that the electrode 723 that can function as a back gate electrode is provided over the insulating layer 729.

FIGS. 17A1 to 17C2 illustrate cross-sectional views in the channel width direction of the transistor 810, the transistor 811, the transistor 820, the transistor 821, the transistor 825, and the transistor 826, respectively.

In each of the structures shown in FIGS. 17B2 and 17C2, the gate electrode is connected to the back gate electrode, and the gate electrode and the back gate electrode have the same potential. In addition, the semiconductor layer 742 is sandwiched between the gate electrode and the back gate electrode.

The length in the channel width direction of each of the gate electrode and the back gate electrode is longer than the length in the channel width direction of the semiconductor layer 742. In the channel width direction, the whole of the semiconductor layer 742 is covered with the gate electrode or the back gate electrode with the insulating layer 726, the insulating layer 741, the insulating layer 728, and the insulating layer 729 sandwiched therebetween.

With the structure, the semiconductor layer 742 included in the transistor can be electrically surrounded by electric fields of the gate electrode and the back gate electrode.

A device structure of a transistor, like that of the transistor 811, the transistor 821 or the transistor 826, in which electric fields of a gate electrode and a back gate electrode electrically surround the semiconductor layer 742 where a channel formation region is formed can be referred to as a Surrounded channel (S-channel) structure.

With the S-channel structure, an electric field for inducing a channel can be effectively applied to the semiconductor layer 742 by one or both of the gate electrode and the back gate electrode, which enables improvement in the current drive capability of the transistor and high on-state current characteristics. In addition, since the on-state current can be increased, it is possible to scale down the transistor. Furthermore, with the S-channel structure, the mechanical strength of the transistor can be increased.

[Top-Gate Transistor]

A transistor 842 illustrated as an example in FIG. 18A1 is a kind of top-gate transistor. As for the transistor 842, after the insulating layer 729 is formed, the electrode 744a and the electrode 744b are formed. The electrode 744a and the electrode 744b are electrically connected to the semiconductor layer 742 in opening portions formed in the insulating layer 728 and the insulating layer 729.

In addition, part of the insulating layer 726 that does not overlap with the electrode 746 is removed, and an impurity is introduced into the semiconductor layer 742 using the electrode 746 and the insulating layer 726 which remains after the removal as a mask, so that an impurity region can be formed in the semiconductor layer 742 in a self-aligned manner. The transistor 842 includes a region where the insulating layer 726 extends beyond end portions of the electrode 746. The semiconductor layer 742 in a region into which the impurity is introduced through the insulating layer 726 has a lower impurity concentration than a region into which the impurity is introduced without through the insulating layer 726. Thus, an LDD (Lightly Doped Drain) region is formed in a region of the semiconductor layer 742 that does not overlap with the electrode 746.

A transistor 843 shown in FIG. 18A2 is different from the transistor 842 in that the electrode 723 is included. The transistor 843 includes the electrode 723 formed over the substrate 771. The electrode 723 has a region overlapping with the semiconductor layer 742 with the insulating layer 772 therebetween. The electrode 723 can function as a back gate electrode.

In addition, as in a transistor 844 shown in FIG. 18B1 and a transistor 845 shown in FIG. 18B2, the insulating layer 726 in a region that does not overlap with the electrode 746 may be completely removed. Furthermore, as in a transistor 846 shown in FIG. 18C1 and a transistor 847 shown in FIG. 18C2, the insulating layer 726 may be left.

Also in the transistor 842 to the transistor 847, the impurity is introduced into the semiconductor layer 742 using the electrode 746 as a mask after the formation of the electrode 746, so that an impurity region can be formed in the semiconductor layer 742 in a self-aligned manner. According to one embodiment of the present invention, a transistor with favorable electrical characteristics can be achieved. Furthermore, according to one embodiment of the present invention, a semiconductor device having a high degree of integration can be achieved.

FIGS. 19A1 to 19C2 illustrate cross-sectional views in the channel width direction of the transistor 842 to the transistor 847, respectively.

The transistor 843, the transistor 845, and the transistor 847 each have the above-described S-channel structure; however, one embodiment of the present invention is not limited to this, and the transistor 843, the transistor 845, and the transistor 847 do not necessarily have the S-channel structure.

This embodiment can be implemented in an appropriate combination with the structures described in the other embodiments and the like.

Embodiment 3

In this embodiment, a specific configuration example of an OS transistor will be described.

A semiconductor layer included in an OS transistor can be, for example, a film represented by an In-M-Zn-based oxide that contains indium, zinc, and M (a metal such as aluminum, titanium, gallium, germanium, yttrium, zirconium, lanthanum, cerium, tin, neodymium, or hafnium).

In the case where an oxide semiconductor that constitutes the semiconductor layer is an In-M-Zn-based oxide, it is preferable that the atomic ratio of metal elements in a sputtering target used to deposit an In-M-Zn oxide satisfy In≥M and Zn≥M. The atomic ratio of metal elements of such a sputtering target is preferably In:M:Zn=1:1:1, In:M:Zn=1:1:1.2, In:M:Zn=3:1:2, In:M:Zn=4:2:3, In:M:Zn=4:2:4.1, In:M:Zn=5:1:6, In:M:Zn=5:1:7, In:M:Zn=5:1:8, or the like. Note that the atomic ratio in the deposited semiconductor layer varies from the atomic ratio of metal elements in the sputtering targets in a range of ±40%.

An oxide semiconductor with low carrier density is used for the semiconductor layer. For example, for the semiconductor layer, an oxide semiconductor whose carrier density is lower than or equal to $1\times10^{17}/cm^3$, preferably lower than or equal to $1\times10^{15}/cm^3$, further preferably lower than or equal to $1\times10^{13}/cm^3$, still further preferably lower than or equal to $1\times10^{11}/cm^3$, even further preferably lower than $1\times10^{10}/cm^3$, and higher than or equal to $1\times10^{-9}/cm^3$ can be used. Such an oxide semiconductor is referred to as a highly purified intrinsic or substantially highly purified intrinsic oxide semiconductor. The oxide semiconductor has low density of defect states and can be regarded as an oxide semiconductor having stable characteristics.

Note that the composition is not limited to those, and a material having appropriate composition may be used depending on required semiconductor characteristics and electrical characteristics of the transistor (field-effect mobility, threshold voltage, or the like). In addition, to obtain the required semiconductor characteristics of the transistor, it is preferable that the carrier density, impurity concentration, defect density, atomic ratio between a metal element and oxygen, interatomic distance, density, and the like of the semiconductor layer be set to be appropriate.

When silicon or carbon, which is one of the Group 14 elements, is contained in the oxide semiconductor that constitutes the semiconductor layer, oxygen vacancies are increased, and the semiconductor layer becomes n-type. Thus, the concentration (concentration obtained by secondary ion mass spectrometry) of silicon or carbon in the semiconductor layer is set to lower than or equal to $2\times10^{18}$ atoms/cm$^3$, preferably lower than or equal to $2\times10^{17}$ atoms/cm$^3$.

In addition, alkali metal and alkaline earth metal might generate carriers when bonded to an oxide semiconductor, in which case the off-state current of the transistor might be increased. Thus, the concentration (concentration obtained by secondary ion mass spectrometry) of alkali metal or alkaline earth metal in the semiconductor layer is set to lower than or equal to $1\times10^{18}$ atoms/cm$^3$, preferably lower than or equal to $2\times10^{16}$ atoms/cm$^3$.

Furthermore, when nitrogen is contained in the oxide semiconductor that constitutes the semiconductor layer, electrons serving as carriers are generated and the carrier density is increased, so that the semiconductor layer easily becomes n-type. As a result, a transistor using an oxide semiconductor that contains nitrogen is likely to have normally-on characteristics. Therefore, the concentration (concentration obtained by secondary ion mass spectrometry) of nitrogen in the semiconductor layer is preferably set to lower than or equal to $5\times10^{18}$ atoms/cm$^3$.

Moreover, the semiconductor layer may have a non-single-crystal structure, for example. The non-single-crystal structure includes, for example, a CAAC-OS including a c-axis aligned crystal, a polycrystalline structure, a microcrystalline structure, or an amorphous structure. Among the non-single-crystal structures, the amorphous structure has the highest density of defect states, whereas the CAAC-OS has the lowest density of defect states.

An oxide semiconductor film having an amorphous structure has disordered atomic arrangement and no crystalline component, for example. Moreover, an oxide film having an amorphous structure has a completely amorphous structure and no crystal part, for example.

Note that the semiconductor layer may be a mixed film including two or more kinds selected from a region having an amorphous structure, a region having a microcrystalline structure, a region having a polycrystalline structure, a CAAC-OS region, and a region having a single crystal structure. The mixed film has, for example, a single-layer structure or a stacked-layer structure including two or more kinds of regions selected from the above regions in some cases.

The composition of a CAC-OS, which is one embodiment of a non-single-crystal semiconductor layer, is described below.

The CAC-OS is, for example, a composition of a material in which elements that constitute an oxide semiconductor are unevenly distributed to have a size of greater than or equal to 0.5 nm and less than or equal to 10 nm, preferably greater than or equal to 1 nm and less than or equal to 2 nm, or a similar size. Note that in the following description, a state in which one or more metal elements are unevenly distributed and regions including the metal element(s) are mixed to have a size of greater than or equal to 0.5 nm and less than or equal to 10 nm, preferably greater than or equal to 1 nm and less than or equal to 2 nm, or a similar size in an oxide semiconductor is referred to as a mosaic pattern or a patch-like pattern.

Note that the oxide semiconductor preferably contains at least indium. In particular, indium and zinc are preferably contained. Moreover, in addition to these, one kind or a plurality of kinds selected from aluminum, gallium, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like may be contained.

For example, a CAC-OS in an In—Ga—Zn oxide (an In—Ga—Zn oxide in the CAC-OS may be particularly referred to as CAC-IGZO) has a composition in which materials are separated into indium oxide (hereinafter referred to as $InO_{X1}$ (X1 is a real number greater than 0)) or indium zinc oxide (hereinafter referred to as $In_{X2}Zn_{Y2}O_{Z2}$ (each of X2, Y2, and Z2 is a real number greater than 0)) and gallium oxide (hereinafter referred to as $GaO_{X3}$ (X3 is a real number greater than 0)), gallium zinc oxide (hereinafter referred to as $Ga_{X4}Zn_{Y4}O_{Z4}$ (each of X4, Y4, and Z4 is a real number greater than 0)), or the like so that a mosaic pattern is formed, and mosaic-like $InO_{X1}$ or $In_{X2}Zn_{Y2}O_{Z2}$ is evenly distributed in the film (this composition is hereinafter also referred to as a cloud-like composition).

That is, the CAC-OS is a composite oxide semiconductor having a composition in which a region where $GaO_{X3}$ is a main component and a region where $In_{X2}Zn_{Y2}O_{Z2}$ or $InO_{X1}$ is a main component are mixed. Note that in this specification, for example, when the atomic ratio of In to an element M in a first region is larger than the atomic ratio of In to the element M in a second region, the first region is regarded as having a higher In concentration than the second region.

Note that IGZO is a commonly known name and sometimes refers to one compound formed of In, Ga, Zn, and O. A typical example is a crystalline compound represented by $InGaO_3(ZnO)_{m1}$ (m1 is a natural number) or $In_{(1+x0)}Ga_{(1-x0)}O_3(ZnO)_{m0}$ ($-1 \leq x0 \leq 1$; m0 is a given number).

The crystalline compound has a single crystal structure, a polycrystalline structure, or a CAAC structure. Note that the CAAC structure is a crystal structure in which a plurality of IGZO nanocrystals have c-axis alignment and are connected in an a-b plane without alignment.

Meanwhile, the CAC-OS relates to the material composition of an oxide semiconductor. In the material composition of a CAC-OS containing In, Ga, Zn, and O, some regions that contain Ga as a main component and are observed as nanoparticles and some regions that contain In as a main component and are observed as nanoparticles are each randomly dispersed in a mosaic pattern. Therefore, the crystal structure is a secondary element for the CAC-OS.

Note that the CAC-OS is regarded as not including a stacked-layer structure of two or more kinds of films with different compositions. For example, a two-layer structure of a film containing In as a main component and a film containing Ga as a main component is not included.

Note that a clear boundary between the region where $GaO_{X3}$ is a main component and the region where $In_{X2}Zn_{Y2}O_{Z2}$ or $InO_{X1}$ is a main component cannot be observed in some cases.

Note that in the case where one kind or a plurality of kinds selected from aluminum, yttrium, copper, vanadium, beryllium, boron, silicon, titanium, iron, nickel, germanium, zirconium, molybdenum, lanthanum, cerium, neodymium, hafnium, tantalum, tungsten, magnesium, and the like are contained instead of gallium, the CAC-OS refers to a composition in which some regions that contain the metal element(s) as a main component and are observed as nanoparticles and some regions that contain In as a main component and are observed as nanoparticles are each randomly dispersed in a mosaic pattern.

The CAC-OS can be formed by a sputtering method under a condition where a substrate is not heated intentionally, for example. In addition, in the case of forming the CAC-OS by a sputtering method, one or more selected from an inert gas (typically, argon), an oxygen gas, and a nitrogen gas may be used as a deposition gas. Furthermore, the ratio of the flow rate of an oxygen gas to the total flow rate of the deposition gas at the time of deposition is preferably as low as possible, and for example, the ratio of the flow rate of the oxygen gas is preferably higher than or equal to 0% and lower than 30%, further preferably higher than or equal to 0% and lower than or equal to 10%.

The CAC-OS is characterized in that no clear peak is observed at the time of measurement using θ/2θ scan by an Out-of-plane method, which is one of the X-ray diffraction (XRD) measurement methods. That is, it is found from X-ray diffraction measurement that no alignment in an a-b plane direction and a c-axis direction is observed in a measured region.

In addition, in an electron diffraction pattern of the CAC-OS that is obtained by irradiation with an electron beam with a probe diameter of 1 nm (also referred to as a nanobeam electron beam), a ring-like high-luminance region (a ring region) and a plurality of bright spots in the ring region are observed. It is therefore found from the electron diffraction pattern that the crystal structure of the CAC-OS includes an nc (nano-crystal) structure with no alignment in a plan-view direction and a cross-sectional direction.

Moreover, for example, it can be confirmed by EDX mapping obtained using energy dispersive X-ray spectroscopy (EDX) that the CAC-OS in the In—Ga—Zn oxide has a composition in which regions where $GaO_{X3}$ is a main component and regions where $In_{X2}Zn_{Y2}O_{Z2}$ or $InO_{X1}$ is a main component are unevenly distributed and mixed.

The CAC-OS has a composition different from that of an IGZO compound in which metal elements are evenly distributed, and has characteristics different from those of the IGZO compound. That is, the CAC-OS has a composition in which regions where $GaO_{X3}$ or the like is a main component and regions where $In_{X2}Zn_{Y2}O_{Z2}$ or $InO_{X1}$ is a main component are phase-separated from each other, and the regions including the respective elements as the main components form a mosaic pattern.

Here, a region where $In_{X2}Zn_{Y2}O_{Z2}$ or $InO_{X1}$ is a main component is a region whose conductivity is higher than that of a region where $GaO_{X3}$ or the like is a main component. In other words, when carriers flow through regions where $In_{X2}Zn_{Y2}O_{Z2}$ or $InO_{X1}$ is a main component, the conductivity of an oxide semiconductor is exhibited. Accordingly, when the regions where $In_{X2}Zn_{Y2}O_{Z2}$ or $InO_{X1}$ is a main component are distributed like a cloud in an oxide semiconductor, high field-effect mobility (μ) can be achieved.

By contrast, a region where $GaO_{X3}$ or the like is a main component is a region whose insulating property is higher than that of a region where $In_{X2}Zn_{Y2}O_{Z2}$ or $InO_{X1}$ is a main component. In other words, when regions where $GaO_{X3}$ or the like is a main component are distributed in an oxide semiconductor, leakage current can be suppressed and favorable switching operation can be achieved.

Accordingly, when the CAC-OS is used for a semiconductor element, the insulating property derived from $GaO_{X3}$ or the like and the conductivity derived from $In_{X2}Zn_{Y2}O_{Z2}$ or $InO_{X1}$ complement each other, so that high on-state current ($I_{on}$) and high field-effect mobility (μ) can be achieved.

Moreover, a semiconductor element using the CAC-OS has high reliability. Thus, the CAC-OS is suitable for a constituent material in a variety of semiconductor devices.

This embodiment can be implemented in an appropriate combination with the structures described in the other embodiments and the like.

Embodiment 4

In this embodiment, electronic devices of embodiments of the present invention will be described with reference to FIGS. 20A to 20D.

An electronic device in this embodiment is provided with the display apparatus of one embodiment of the present invention. Thus, the electronic device can be inexpensive.

The display portion of the electronic device in this embodiment can display an image with a resolution of, for example, full high definition, 2K, 4K, 8K, 16K, or higher. In addition, as a screen size of the display portion, the diagonal size can be greater than or equal to 20 inches, greater than or equal to 30 inches, greater than or equal to 50 inches, greater than or equal to 60 inches, or greater than or equal to 70 inches.

Examples of the electronic device include a digital camera, a digital video camera, a digital photo frame, a mobile phone, a portable game console, a portable information terminal, and an audio reproducing device in addition to electronic devices provided with a comparatively large screen, such as a television device, a desktop or laptop personal computer, a monitor for a computer and the like, digital signage, and a large game machine such as a pachinko machine.

The electronic device of one embodiment of the present invention may include an antenna. When a signal is received by the antenna, the electronic device can display an image, data, or the like on the display portion. When the electronic device includes the antenna and a secondary battery, the antenna may be used for contactless power transmission.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radioactive rays, flow rate, humidity, gradient, oscillation, a smell, or infrared rays).

The electronic device of one embodiment of the present invention can have a variety of functions. For example, the electronic device can have a function of displaying a variety of data (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 20A:
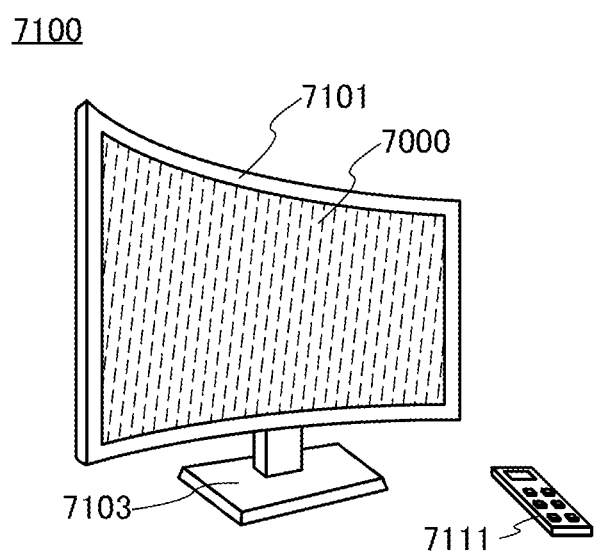
FIGS. 20A, 20B, 20C, and 20D are diagrams showing examples of electronic devices.

FIG. 20A illustrates an example of a television device. In a television device 7100, a display portion 7000 is incorporated in a housing 7101. Here, a structure in which the housing 7101 is supported by a stand 7103 is illustrated.

The display apparatus of one embodiment of the present invention can be used for the display portion 7000.

Operation of the television device 7100 shown in FIG. 20A can be performed with an operation switch provided in the housing 7101 or a separate remote controller 7111. Alternatively, the display portion 7000 may include a touch sensor, and the television device 7100 may be operated by touch on the display portion 7000 with a finger or the like. The remote controller 7111 may be provided with a display portion for displaying data output from the remote controller 7111. With operation keys or a touch panel provided in the remote controller 7111, channels and volume can be operated and images displayed on the display portion 7000 can be operated.

Note that the television device 7100 has a structure in which a receiver, a modem, and the like are provided. A general television broadcast can be received with the receiver. When the television device is connected to a communication network with or without wires via the modem, one-way (from a transmitter to a receiver) or two-way (between a transmitter and a receiver or between receivers, for example) data communication can be performed.

Figure 20B:
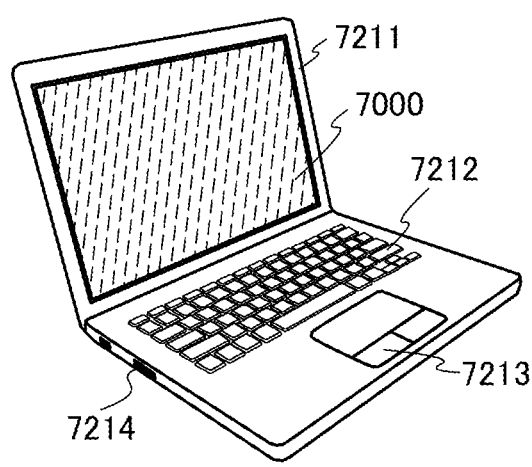

FIG. 20B illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The display apparatus of one embodiment of the present invention can be used for the display portion 7000.

Figure 20C:
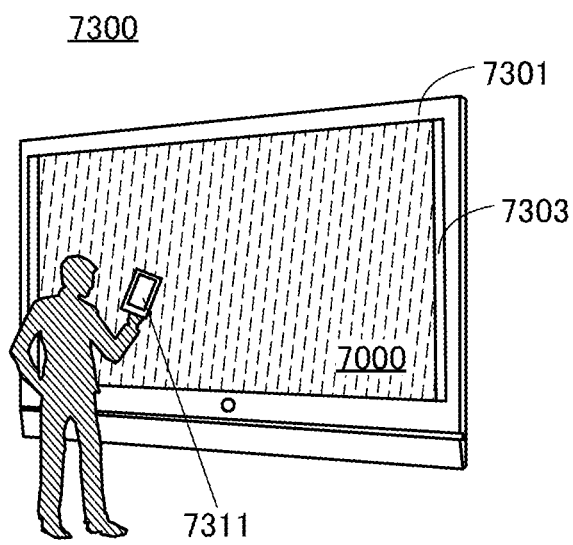

FIGS. 20C and 20) illustrate examples of digital signage.

Digital signage 7300 shown in FIG. 20C includes a housing 7301, the display portion 7000, a speaker 7303, and the like. Furthermore, the digital signage can include an LED lamp, operation keys (including a power switch or an operation switch), a connection terminal, a variety of sensors, a microphone, and the like.

Figure 20D:
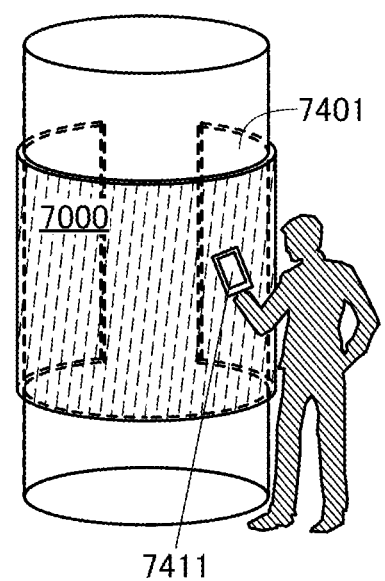

FIG. 20D is digital signage 7400 attached to a cylindrical pillar 7401. The digital signage 7400 includes the display portion 7000 provided along a curved surface of the pillar 7401.

The display apparatus of one embodiment of the present invention can be used for the display portion 7000 in FIGS. 20C and 20D.

A larger area of the display portion 7000 can provide more data at a time. The larger display portion 7000 attracts more attention, so that the effectiveness of the advertisement can be increased, for example.

The use of a touch panel in the display portion 7000 is preferable because in addition to display of a still image or a moving image on the display portion 7000, intuitive operation by a user is possible. Moreover, for an application for providing information such as route information or traffic information, usability can be enhanced by intuitive operation.

Furthermore, as shown in FIGS. 20C and 20D, it is preferable that the digital signage 7300 or the digital signage 7400 work with an information terminal 7311 or an information terminal 7411 such as a user's smartphone through wireless communication. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

It is possible to make the digital signage 7300 or the digital signage 7400 execute a game with the use of the screen of the information terminal 7311 or the information terminal 7411 as an operation means (controller). Thus, an unspecified number of users can join in and enjoy the game concurrently.

The display system of one embodiment of the present invention can be incorporated along a curved inside/outside wall surface of a house or a building or a curved interior/exterior surface of a vehicle.

This embodiment can be implemented in combination with the structures described in the other embodiments and the like as appropriate.

REFERENCE NUMERALS

10: display apparatus, 11: pixel, 11a: pixel, 11b: pixel, 11c: pixel, 11d: pixel, 11e: pixel, 11f: pixel, 12: gate driver circuit, 13: source driver circuit, 14: pixel array, 15: circuit, 16: switch circuit, 21: transistor, 22: transistor, 23: transistor, 24: transistor, 25: capacitor, 26: display device, 31: wiring, 32: wiring, 33: wiring, 34: wiring, 35: wiring, 36: wiring, 41: shift register, 42: latch circuit, 43: level shift circuit, 44: DA converter circuit, 46: amplifier circuit, 48a: switch, 48b: switch, 49a: switch, 49b: switch, 49c: switch, 49d: switch, 51: data bus wiring, 61: image data generation circuit, 62: image processing circuit, 63: level shift circuit, 63a: level shift circuit, 63b: level shift circuit, 63c: level shift circuit, 63d: level shift circuit, 64: inverter circuit, 65: selection circuit, 68a: transistor, 68b: transistor, 70: potential generation circuit, 71: transistor, 72: capacitor, 81: wiring, 111: substrate, 113: substrate, 121: overcoat, 125a: polarizing plate, 125b: polarizing plate, 131: coloring layer, 132: light-blocking layer, 141: bonding layer, 162: FPC, 181: electrode, 182: electrode, 183: liquid crystal layer, 211: insulating layer, 212: insulating layer, 215: insulating layer, 217: insulating layer, 220: insulating layer, 221: conductive layer, 222a: conductive layer, 222b: conductive layer, 224: conductive layer, 231: semiconductor layer, 242: connector, 255: conductive layer, 552: backlight unit, 565: conductive layer, 723: electrode, 726: insulating layer, 728: insulating layer, 729: insulating layer, 741: insulating layer, 742: semiconductor layer, 744a: electrode, 744b: electrode, 746: electrode, 771: substrate, 772: insulating layer, 810: transistor, 811: transistor, 820: transistor, 821: transistor, 825: transistor, 826: transistor, 842: transistor, 843: transistor, 844: transistor, 845: transistor, 846: transistor, 847: transistor, 7000: display portion, 7100: television device, 7101: housing, 7103: stand, 7111: remote controller, 7200: laptop personal computer, 7211: housing, 7212: keyboard, 7213: pointing device, 7214: external connection port, 7300: digital signage, 7301: housing, 7303: speaker, 7311: information terminal, 7400: digital signage, 7401: pillar, 7411: information terminal.

This application is based on Japanese Patent Application Serial No. 2018-006841 filed with Japan Patent Office on Jan. 19, 2018, the entire contents of which are hereby incorporated herein by reference.

The invention claimed is:

1. A display apparatus comprising:
a pixel array comprising a pixel; and
a source driver circuit to which an image data is input,
wherein the pixel comprises a first transistor, a second transistor, a capacitor, and a display device,
wherein one of a source and a drain of the first transistor is electrically connected to one electrode of the capacitor,
wherein the one electrode of the capacitor is electrically connected to one electrode of the display device,
wherein one of a source and a drain of the second transistor is electrically connected to another electrode of the capacitor,
wherein the another electrode of the capacitor is electrically connected to another electrode of the display device,
wherein the other of the source and the drain of the first transistor is electrically connected to a first wiring,
wherein the other of the source and the drain of the second transistor is electrically connected to a second wiring,
wherein the source driver circuit is electrically connected to the first wiring and the second wiring,
wherein the first wiring and the second wiring are electrically connected to a selection circuit in the source driver circuit,
wherein the selection circuit is electrically connected to one terminal of a first switch and one terminal of a second switch,
wherein a first potential is applied to another terminal of the first switch,
wherein a second potential is applied to another terminal of the second switch, and
wherein the first switch and the second switch are controlled to be ON or OFF in accordance with an amplitude voltage included in the image data.

2. The display apparatus according to claim 1,
wherein data comprising information about a most significant bit of the image data is applied to one of the first wiring and the second wiring, and
wherein data comprising information about low-order bits of the image data is applied to the other of the first wiring and the second wiring.

3. A display apparatus comprising:
a pixel array comprising a pixel; and
a source driver circuit to which an image data is input,
wherein the pixel comprises a first transistor, a second transistor, a third transistor, a capacitor, and a display device,
wherein one of a source and a drain of the first transistor is electrically connected to one electrode of the capacitor,
wherein the one electrode of the capacitor is electrically connected to one electrode of the display device,
wherein one of a source and a drain of the second transistor is electrically connected to another electrode of the capacitor,
wherein the another electrode of the capacitor is electrically connected to another electrode of the display device,
wherein one of a source and a drain of the third transistor is electrically connected to the another electrode of the capacitor,
wherein the other of the source and the drain of the first transistor is electrically connected to a first wiring,
wherein the other of the source and the drain of the second transistor is electrically connected to a second wiring,
wherein the other of the source and the drain of the third transistor is electrically connected to a third wiring,
wherein the source driver circuit is electrically connected to the first wiring and the second wiring,
wherein the first wiring and the second wiring are electrically connected to a selection circuit in the source driver circuit,
wherein the selection circuit is electrically connected to one terminal of a first switch and one terminal of a second switch,
wherein a first potential is applied to another terminal of the first switch,
wherein a second potential is applied to another terminal of the second switch, and
wherein the first switch and the second switch are controlled to be ON or OFF in accordance with an amplitude voltage included in the image data.

4. The display apparatus according to claim 3,
wherein data comprising information about a most significant bit of the image data is applied to one of the first wiring and the second wiring, and
wherein data comprising information about low-order bits of the image data is applied to the other of the first wiring and the second wiring.

5. The display apparatus according to claim 3,
wherein the third wiring is a common wiring.

* * * * *